(12) United States Patent
Simon

(10) Patent No.: US 12,553,229 B2
(45) Date of Patent: *Feb. 17, 2026

(54) PERSONAL PERINEAL CLEANSING SYSTEM AND METHODS

(71) Applicant: Kelley Simon, Las Vegas, NV (US)

(72) Inventor: Kelley Simon, Las Vegas, NV (US)

(*) Notice: Subject to any disclaimer, the term of this patent is extended or adjusted under 35 U.S.C. 154(b) by 214 days.

This patent is subject to a terminal disclaimer.

(21) Appl. No.: 18/358,006

(22) Filed: Jul. 24, 2023

(65) Prior Publication Data

US 2023/0374765 A1 Nov. 23, 2023

Related U.S. Application Data

(63) Continuation-in-part of application No. 17/588,151, filed on Jan. 28, 2022, now Pat. No. 11,708,688, which is a continuation-in-part of application No. 16/908,028, filed on Jun. 22, 2020, now Pat. No. 11,234,562, and a continuation-in-part of application No. 16/237,644, filed on Dec. 31, 2018, now Pat. No. 10,689,836.

(51) Int. Cl.
*E03D 9/08* (2006.01)
*E03C 1/04* (2006.01)
*E03C 1/12* (2006.01)

(52) U.S. Cl.
CPC ............. *E03D 9/08* (2013.01); *E03C 1/0408* (2013.01); *E03C 2001/1213* (2013.01)

(58) Field of Classification Search
CPC ......... E03D 9/08; E03D 9/085; E03C 1/0408; E03C 2001/1213

USPC .................................. 4/443–448, 420, 420.3
See application file for complete search history.

(56) References Cited

U.S. PATENT DOCUMENTS

| | | | | |
|---|---|---|---|---|
| 3,164,846 | A * | 1/1965 | Foster | A61M 3/0208 4/420.1 |
| 7,156,195 | B2 * | 1/2007 | Yamagishi | F16H 57/0476 310/60 A |
| 7,395,094 | B2 * | 7/2008 | Hovers | H04W 16/28 455/562.1 |
| 7,456,368 | B2 * | 11/2008 | Fukumoto | H01H 27/002 200/43.04 |
| 10,689,836 | B1 * | 6/2020 | Simon | A61H 1/00 |
| 11,234,562 | B1 * | 2/2022 | Simon | A47K 3/281 |
| 11,495,011 | B2 * | 11/2022 | Zhang | G06V 30/19147 |
| 11,686,080 | B2 * | 6/2023 | Rapp | E03B 7/08 4/596 |
| 11,708,688 | B2 * | 7/2023 | Simon | E03C 1/0408 4/446 |
| 11,795,676 | B2 * | 10/2023 | Dickinson | A47K 3/12 |

* cited by examiner

*Primary Examiner* — Lori L Baker
(74) *Attorney, Agent, or Firm* — Connie R. Masters

(57) ABSTRACT

A personal perineal cleansing system includes a specialized toilet seat comprising a basin with an interior sprayer, a horizontal portion upon which the user sits, a vertical portion disposed behind the user when seated, and a basin re-positioning system that moves the basin from the functional position (near the center of the toilet bowl) within the horizontal portion to the storage position in the vertical portion. The basin re-positioning system may be manually or electronically activated.

19 Claims, 23 Drawing Sheets

PERSONAL PERINEAL CLEANSING SYSTEM AND METHODS

CROSS REFERENCE TO RELATED APPLICATIONS

This application is a continuation-in-part application of U.S. patent application Ser. No. 17/588,151 filed on Jan. 28, 2022 and issued on Jul. 25, 2023 as U.S. Pat. No. 11,708,688, which is a continuation-in-part application of U.S. patent application Ser. No. 16/908,028 filed on Jun. 22, 2020 and issued on Feb. 1, 2022 as U.S. Pat. No. 11,234,562, which is a continuation-in-part application of U.S. patent application Ser. No. 16/237,644 filed on Dec. 31, 2018 and issued on Jun. 23, 2020 as U.S. Pat. No. 10,689,836, which are incorporated herein in their entirety.

FIELD OF INVENTION

This invention relates generally to bathing devices for hygienic purposes, and, more particularly, to a personal perineal cleansing hygiene system with a basin carrying an interior water sprayer.

BACKGROUND OF THE INVENTION

A person that is handicapped, elderly, or otherwise has limited mobility may not be able to efficiently clean the perineal area, which is necessary for personal hygiene and comfort, as well as to prevent adverse skin conditions. For example, a person with limited mobility, such as a person with a severe back injury, may not be able to reach the anal area for removing feces after a bowel movement. It would be advantageous for the person with limited mobility to be able to stand upright or sit on the toilet while cleaning the perineal area, but the available cleaning devices have limitations and do not fully meet the needs of a person with limited mobility.

For example, handheld shower wands may be used to attempt to wash the perineal area, but the spray wand often has a spray that is too strong for the delicate skin of the perineal area, is typically too short, is hard to manipulate to direct the water delivery angle, and is angled incorrectly for directing the spray onto the perineal area. Additionally, washing feces onto the bottom surface of the shower or tub may not only be distasteful and unsanitary, but the person with limited mobility is not likely to be able to reach to the bottom surface of the shower or tub to clean and remove any residual waste.

Some conventional perineal cleansing systems are designed for hospital use by a caregiver but are too complex and/or expensive for personal use.

Bidets have also been used to attempt to address this problem. Often bidets are a standalone bowl structure (similar to a standalone toilet) that is placed near the toilet, but this necessitates sufficient floor space to be available. Often separate bidets can only be installed at the time of the construction of the house because space may not be obtainable in a pre-existing bathroom layout. Additionally, if a standalone bidet is to be added to an existing bathroom, major plumbing and structural alterations are often needed. Some bidets are available that are attachable to a toilet. These comprise sprayers that are directed to the general area of the body, but they typically do not adequately cleanse, and they often cause overspray.

Accordingly, a personal perineal cleansing device is needed that is specifically designed to clean the delicate skin of the perineal area, and that, when used in a shower, a bathtub, or a toilet, provides improved cleansing of the perineal area, that does not require major plumbing alternations during installation, that does not use additional floor space, and that does not require any construction work to install.

BRIEF SUMMARY OF THE INVENTION

The present invention is directed to a personal perineal cleansing hygiene system and methods of assembly and use that allows a person to clean the perineal area. This system is usable by all, but it may provide particular advantages to a person with limited mobility.

Six embodiments are presented. In the first embodiment, the personal perineal cleansing system is a handheld device added onto a shower. In the second embodiment, it is a handheld device added to a bathtub installation (using either the bathtub floor drain or the bathtub overflow drain). In the third embodiment, the handheld device is usable with a modified toilet. In the fourth embodiment, the handheld device is portable and is usable for camping or long-haul trucking. In the fifth embodiment, the device is not handheld, but is instead a basin bidet incorporated into a secondary toilet seat that is installed as an add-on to an existing toilet. In the sixth embodiment, the personal perineal cleansing system is incorporated into a toilet seat and may be an add-on to an existing standard toilet or used with a specialized toilet. Another type of personal perineal cleansing is disclosed in the sixth embodiment, which provides a generally L-shaped toilet seat with a horizontal portion upon which a person is seated and with a vertical portion disposed behind the seated person. A manually or mechanically movable basin carrying a sprayer is integrated into the inventive toilet seat with the basin shiftable from a storage position in the vertical back portion of the toilet seat to a functional, operating position in the horizontal portion of the toilet seat.

The water input for the personal perineal cleansing system of the first to third and the fifth to sixth embodiments comes from existing piping or fixtures in the bathroom. Thus, it is easily installed and does not require major plumbing changes or extensive modifications to a bathroom. The fourth embodiment is self-contained, so the water for the fourth embodiment comes from an integrated water tank. The water supply for the fifth and sixth embodiments comes from the water piping that supplies water to the tank of the toilet.

In contrast to a free-standing bidet, the personal perineal cleansing system does not require any additional floor space to be allocated to it.

In an aspect of the first four embodiments of the invention, the personal perineal cleansing system includes a three-connection handle with connections to the spray arm at the top, middle, and bottom of the handle.

In an additional aspect of the first four embodiments of the invention, the personal perineal cleansing system includes a two-connection handle with connections to the spray arm at the top and bottom of the handle.

In a one aspect of the first four embodiments of the invention, the handle of the personal perineal cleansing system comprises a two-grip design that is easily grasped by two hands.

In another aspect of the first four embodiments, the personal perineal cleansing system includes a handle interior reservoir, a handle input port that allows introduction of a fluid into the interior reservoir, and a handle shut-off valve that, when open, allows the fluid from the interior reservoir to enter the fluid flow passage of the spray arm.

In an additional aspect of the invention, the personal perineal cleansing system includes a buttocks spreader system.

In a further aspect, the personal perineal cleansing system includes a lid to cover the accumulation basin.

In an additional aspect of the first three embodiments, the personal perineal cleansing system includes a two-part drain fitting having an interior portion connected to the removal line and an outer portion with holes allowing drainage of water into the plumbing drainpipe.

In an aspect of the second embodiment of the invention, the personal perineal cleansing system is configured for installation in a combination shower/bathtub using the overflow drain.

In an additional aspect of the second embodiment of the invention, the personal perineal cleansing system is configured for installation in a combination shower/bathtub using the floor drain.

In an aspect of the third embodiment of the invention, the personal perineal cleansing system is configured for use while seated on a modified toilet.

In another aspect of the third embodiment of the invention, the handheld personal cleansing system includes a specialized toilet riser to provide vertical height to accommodate the use of the handheld personal cleansing system.

In an additional aspect of the invention, the personal perineal cleansing system includes a wall mounted holder that provides a location to store the cleaning system when not in use.

In another aspect of the invention, the personal perineal cleansing system includes a spray head with a separator shield.

In an aspect of the fourth embodiment of the invention, the personal perineal cleansing system is self-contained and portable.

In the fifth embodiment of the invention, the personal perineal cleansing system is incorporated into a secondary toilet seat.

In another aspect of the fifth embodiment of the invention, the primary toilet seat and the secondary toilet seat are separately rotatable between a horizontal and a vertical orientation.

In a further aspect of the fifth embodiment of the invention, the secondary toilet seat and the primary toilet seat are integrated into a primary-secondary seat unit.

In the sixth embodiment, a basin is integrated into a generally L-shaped toilet seat.

In an aspect of the sixth embodiment, the personal perineal cleansing system is incorporated into a toilet seat that is used on an existing toilet.

In another aspect of the sixth embodiment, the personal perineal cleansing system is incorporated into a toilet set used on a specially manufactured toilet.

In the sixth embodiment, the basin can be shifted from its vertical storage location to its horizontal functional location.

In a further aspect of the invention, the personal perineal cleansing system has an internal sprayer with nozzles directed upwardly for perineal cleansing and outwardly to rinse the interior of the sprayer.

In another aspect of the invention, the personal perineal cleansing system has an internal sprayer with nozzles directed upwardly only.

In an additional aspect of the invention, the personal perineal cleansing system includes a sprayer with a single nozzle type.

In another aspect of the invention, the personal perineal cleansing system includes a sprayer with multiple nozzle types.

The object of the invention is to provide a personal perineal cleansing system which gives an improved performance over the above-described prior art systems and methods.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Shown throughout the figures, the present invention is directed toward a personal hygiene perineal cleansing system that allows a user to clean his/her perineal area while the system captures waste and/or debris and residual water within an accumulation basin incorporated into the cleansing system and allows efficient disposal of the waste. In five embodiments (the first, second, third, fifth, and sixth embodiments) of the invention, water is introduced into the personal hygiene perineal cleansing system by adding a fitting to a fixture or waterpipe of the bathroom, so it is easy to install and requires no modifications to the installed plumbing. In contrast, the fourth embodiment is self-container and includes a refillable water container. In the embodiments, the personal hygiene perineal cleansing system may be installed for use in a shower, bathtub, combination shower/bathtub, or toilet, or in the fourth embodiment the personal hygiene perineal cleansing system may be a standalone system (such as usable for camping or long-haul trucking).

Figure 1:
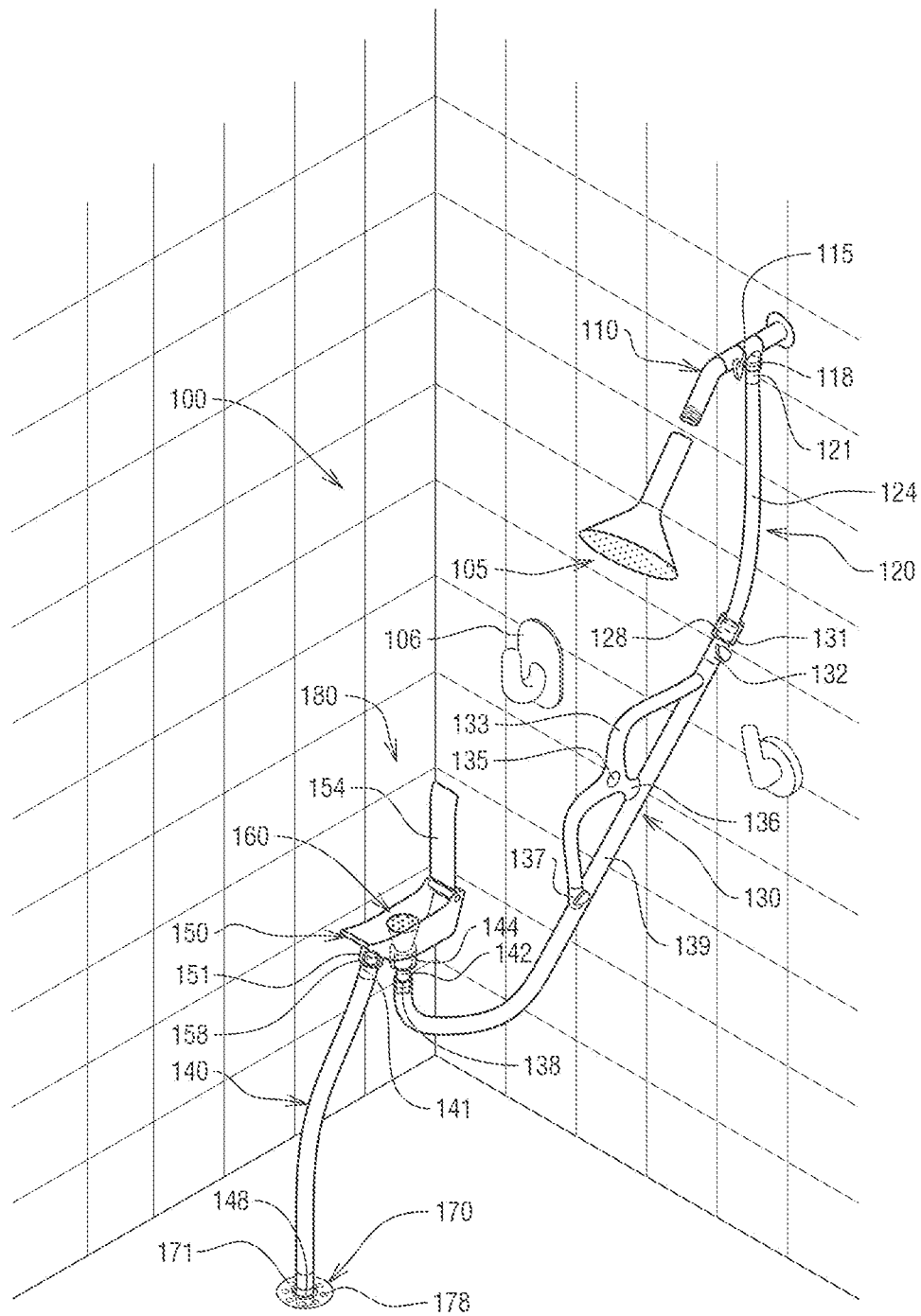
FIG. 1 is a perspective view of a first embodiment of the present invention in an exemplary environment of use, as installed in a shower stall and utilizing the shower floor drain.
Figure 2:
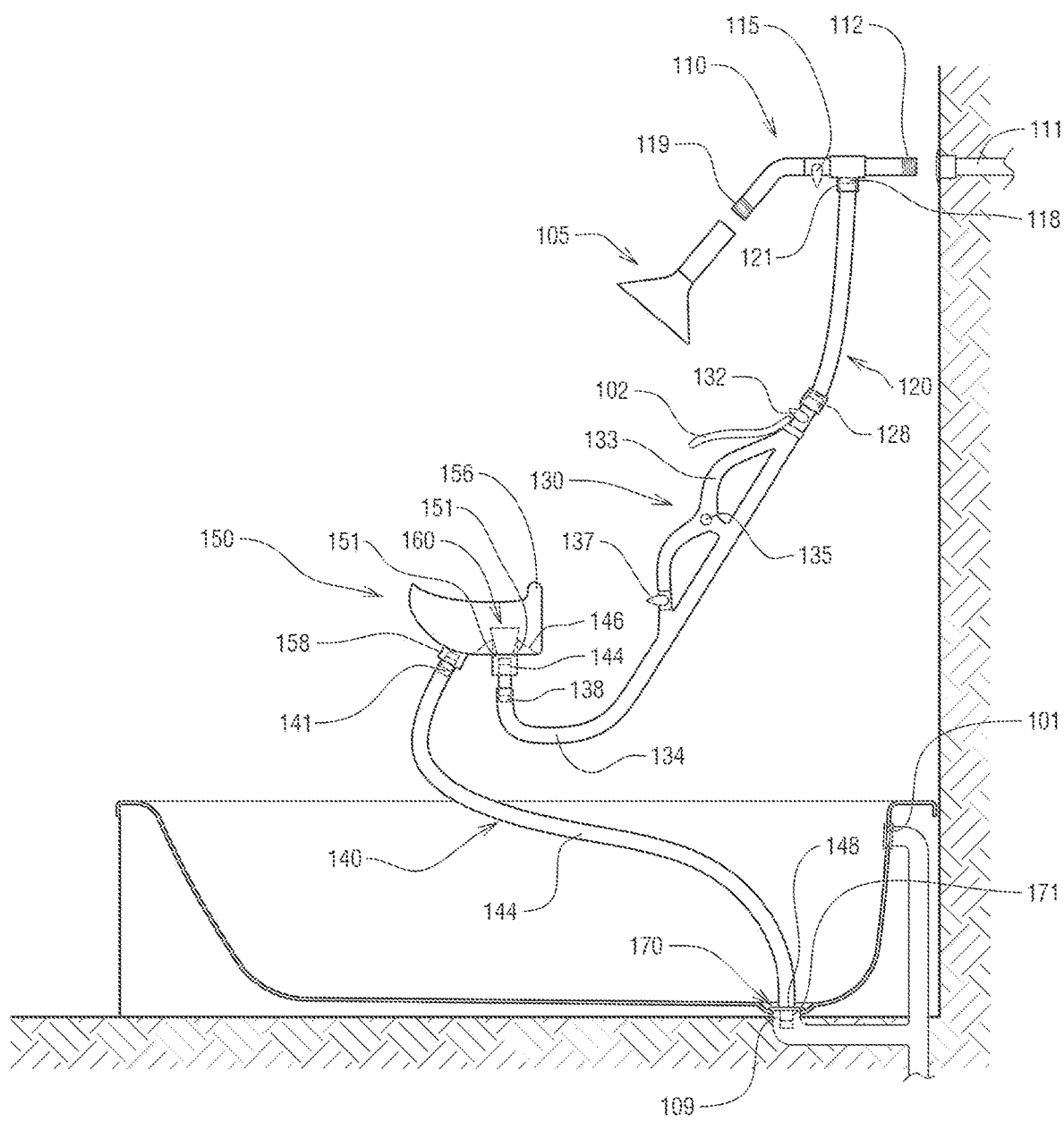
FIG. 2 is a side, partial cut-away view of a second embodiment of the present invention in an exemplary environment of use, utilizing the bathtub floor drain, with the bathtub and wall cut away to show the house plumbing.
Figure 3:
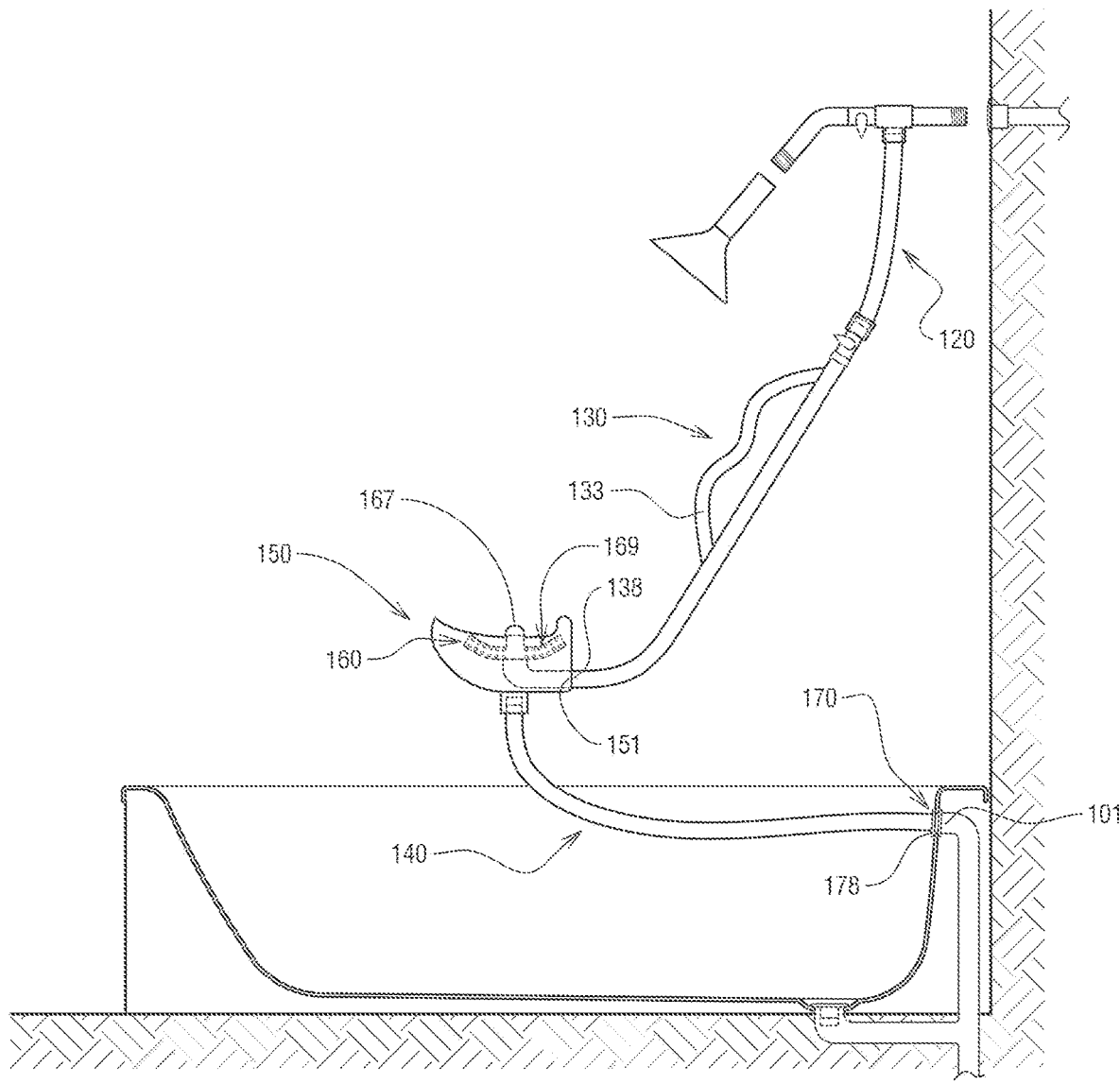
FIG. 3 is a side, partial cut-away view of the second embodiment of the present invention in an exemplary environment of use, utilizing the bathtub overflow drain, with the bathtub and wall cut away to show the house plumbing.
Figure 10:
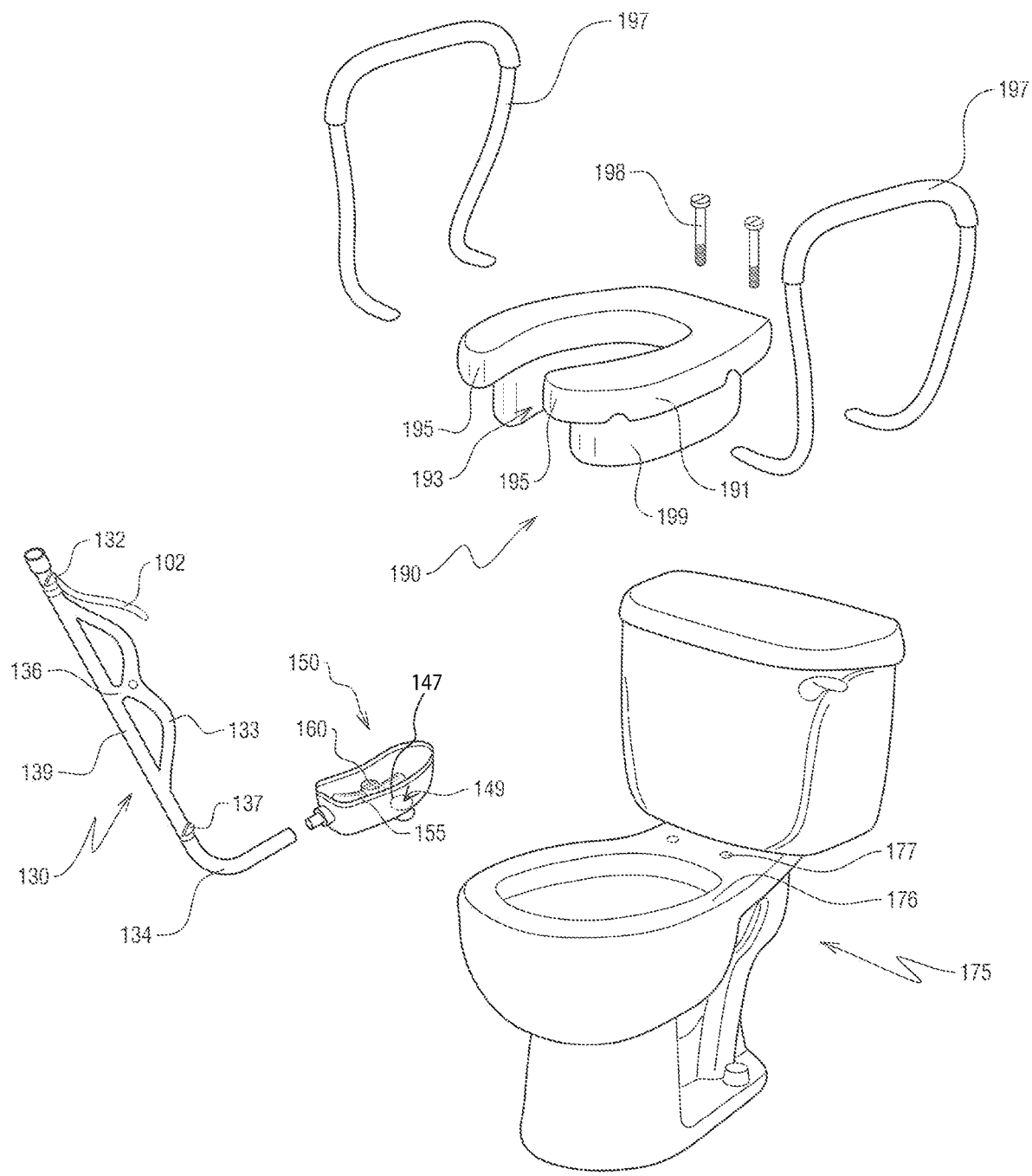
FIG. 10 is an expanded perspective view of a fourth embodiment of the present invention in an exemplary environment of use, for use on a toilet with a specialized riser.
Figure 11:
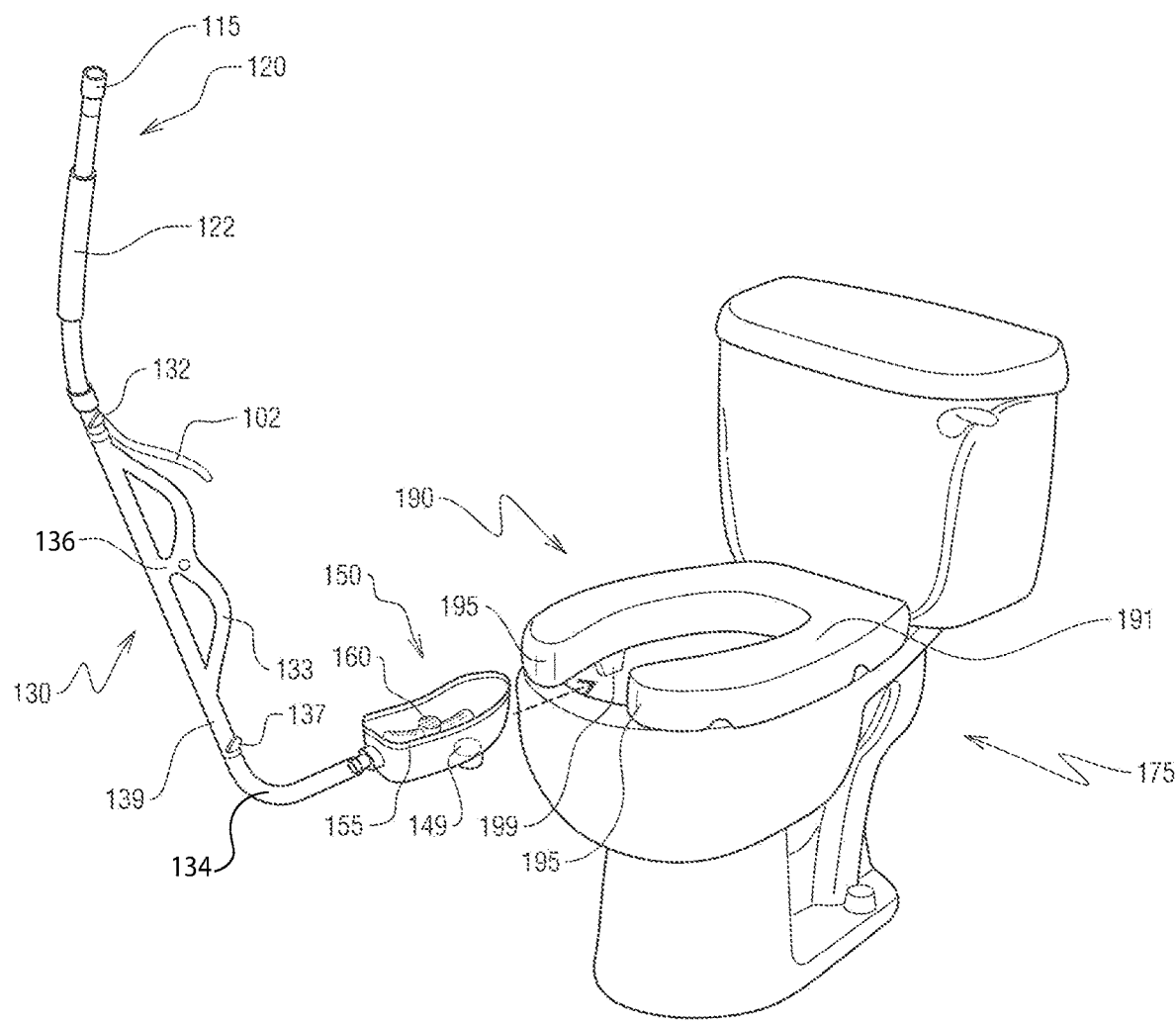
FIG. 11 is a perspective view of a fourth embodiment of the present invention in an exemplary environment of use, as used with a toilet and a specialized riser.

In a first embodiment the personal hygiene perineal cleansing system is handheld and is installed in a shower using the shower floor drainpipe for drainage (FIG. 1). In a second embodiment it is handheld and is installed in a combination shower/bathtub using the bathtub floor drainpipe for drainage (FIG. 2) or is installed in a combination shower/bathtub using the bathtub overflow drainpipe for drainage (FIG. 3). In a third embodiment, the cleansing device is handheld, is installed near a toilet, and uses the toilet for drainage (FIGS. 10-11). In a fourth embodiment (FIGS. 12-13), the handheld device is portable, is self-contained (not connected to a household water line), and is usable for camping or long-haul trucking. In a fifth embodiment (FIGS. 17-22), the cleansing device is not handheld, but is instead installed as an add-on bidet basin to an existing toilet through its integration into a secondary toilet seat. In a sixth embodiment (FIGS. 23-26), the cleansing device is not handheld but is installed as an add-on to a toilet; it is integrated into an inventive toilet seat with a re-positioning system to allow the basin to be moved between functional and storage positions.

In the embodiments in which the personal perineal cleansing system is installed in a shower or bathtub, the water intake may be a fitting introduced between the existing shower water supply pipe and the existing plumbing drainpipes. In the third embodiment the water intake may be a fitting positioned within the toilet water lines, within water lines supplying a sink, or within the existing shower water supply pipe. The water for the fourth embodiment is supplied by an incorporated water tank. The water intake for the fifth and sixth embodiments is preferably the household water line supplying water to the tank of a standard toilet.

Referring now to FIG. 1, a handheld personal hygiene perineal cleansing system, shown generally as reference number 100, is illustrated in accordance with a first embodiment of the present invention. As shown, the handheld personal hygiene perineal cleansing system 100 comprises a water-ingress fitting 110 that connects to and receives a fluid flow from a building's fluid flow pipe 111 (FIG. 2); a water-ingress valve to control the fluid flow into the water-ingress fitting 110; a flexible feeder supply line 120 that connects to and receives a fluid flow from the water-ingress fitting 110; an elongated spray arm 130 that connects to and receives a fluid flow from the feeder supply line 120 and that incorporates an integrated handle 133; an accumulation basin 150 that includes a basin outlet drain 158; a sprayer 160 disposed within the accumulation basin 150 that is fluidly connected to and receives a fluid flow from the spray arm 130; a removal line 140 that connects to and receives a fluid flow from the basin outlet drain 158, and a drain fitting 170 that replaces the existing drain pipe cover and that is configured to allow attachment of the distal end of the removal line 140 while simultaneously allowing water within the shower or bathtub to drain into the building's drain pipes and eventually to the sewer lines.

Figure 23:
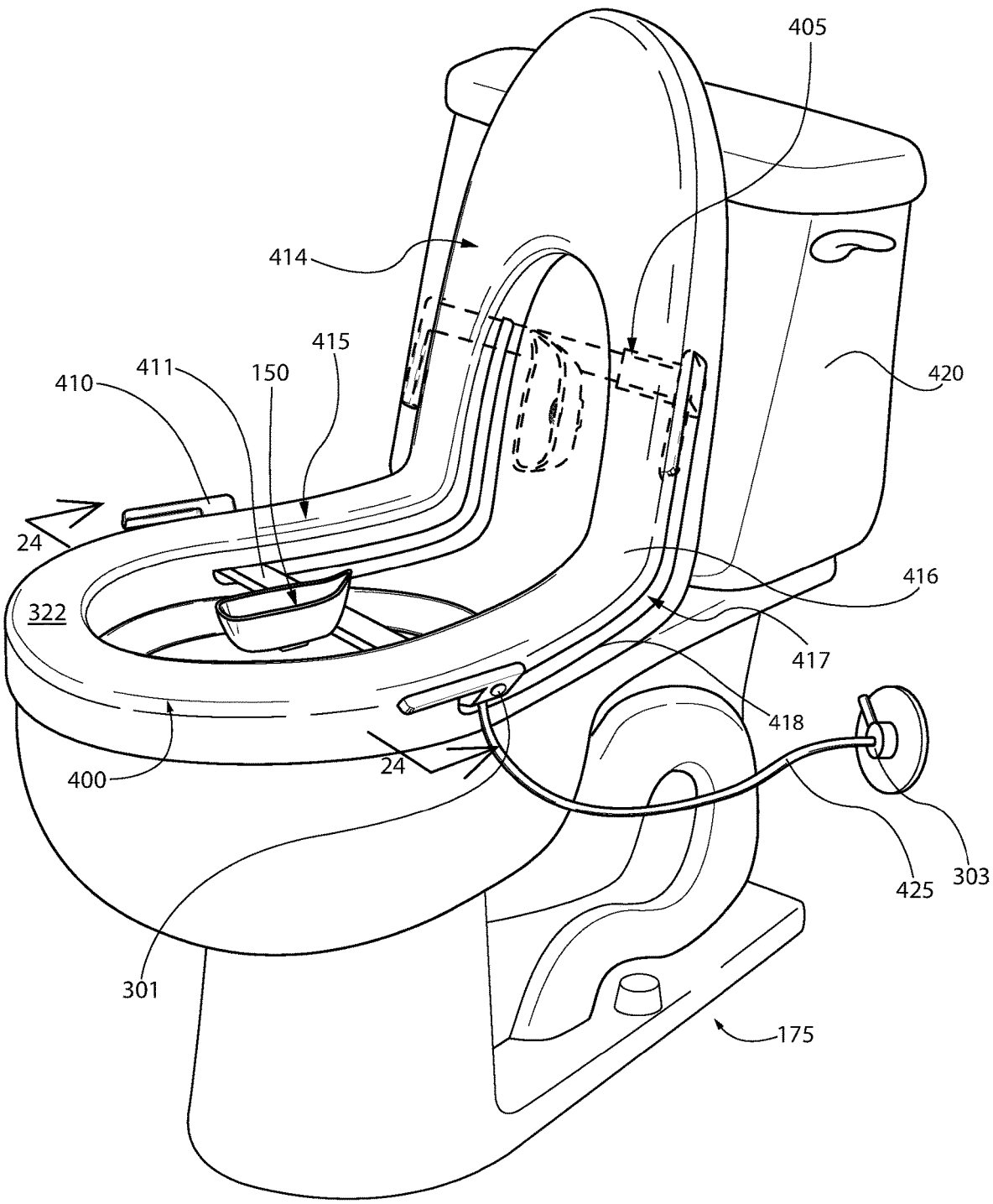
FIG. 23 is a perspective view of the sixth embodiment illustrating a modified toilet having a slanted tank, a modified toilet seat incorporating a sliding bidet basin, and a water supply originating in the wall near the toilet.

One or multiples ones of the water-ingress fitting 110, flexible feeder supply line 120, spray arm 130, and handle 133 may include a plumbing valve or water shut off 303 (FIG. 23). The water-ingress fitting 110 preferably comprises a tee fitting that includes a water-ingress valve 115 that can be shut to prevent fluid from flowing to the showerhead 105 and to thereby allow the water to enter the handheld personal hygiene perineal cleansing system 100. The feeder supply line 120 or the spray arm 130 preferably include a valve 132 to shutoff or turn on the fluid flowing from the water-ingress fitting 110 to the sprayer 160. The handle 133 may optionally have a handle valve 137 to allow secondary fluid that has been introduced into a handle interior reservoir via the handle fill port 135 to flow into the main fluid flow passage of the spray arm 130. These plumbing valves 115, 132, 137 comprise shut-off valves (also known as stop valves or isolating valves), which include gate valves, globe valves, ball valves, or other similar shut-off type valves, but a ball valve type shut-off valve is preferred. The valves may include configurations such as two-port, 3-port, two-stop/one manifold, and the like. In an aspect, the valve 115 may be a two-stop valve on one manifold configuration, and the second shut-off valve 132 would not be necessary. In yet a further aspect, the valve 115 may be a 3-port valve in which the fluid flow from the ingress port 112 may be switched to the first outlet 119 or to the second outlet 118, which also eliminates the need for the second shut-off valve 132.

In a conventional bathroom, a shower or a shower/bath combination has an existing showerhead 105 configured with showerhead nozzles that provide a spray of water into the shower surround or the shower/bath combo surround. Additionally, the existing showerhead 105 has an internal water flow passage and is configured to be attached to, and receive a fluid flow from, the building's fluid flow pipe 111, which in turn has an internal water flow passage and is configured to be attached to and receive a fluid flow typically from a municipal pressurized water supply pipe.

In the first embodiment, the water-ingress fitting 110 of the handheld personal hygiene perineal cleansing system 100 is interposed between the existing fluid flow pipe 111 (FIG. 2) and the showerhead 105. The water-ingress fitting 110 comprises a tee fitting with a tee inlet 112, a first tee outlet 119, a second tee outlet 118, a tee valve-type water-ingress fitting 115, and at least one internal fluid flow passage. The tee inlet 112 is configured to connect via mating connectors to, and to receive a fluid flow from, the fluid flow pipe 111. The first tee outlet 119 is configured to connect via mating connectors to, and to convey a fluid flow to, the showerhead 105 when the tee valve 115 is open. The second tee outlet 118 is configured to connect via mating connectors to, and to convey a fluid flow to, the flexible feeder supply line 120. The mating connectors of this connection and the other connections of the system 100 are standard plumbing mating connectors, such as corresponding male-female threaded portions or corresponding portions of a quick release connector. In one aspect of the invention, the fluid flow pipe 111 has female threads and the tee ingress port 112 is configured with mating male threads; the first tee outlet 119 has male threads and the showerhead 105 has mating female threads; and the second tee outlet 118 and flexible feeder supply line 120 have mating male and female threads. In a further aspect of the invention, the mating connectors may be permanently and fixedly connected. In another preferred aspect of the invention, the mating connectors connecting the second tee outlet 118 and the feeder supply line 120 comprise mating portions of a quick release connector.

The flexible feeder supply line 120 comprises at least one internal fluid flow passage, a feeder supply line inlet 121, a flexible tubing 124, and a feeder supply line outlet 128. The flexible tubing 124 comprises a water supply line suitable for hot and cold water that extends from the feeder supply line inlet 121 to the feeder supply line outlet 128. Preferably the flexible tubing comprises a bendable braided line. Braided line types include braided nylon flex tubes made from reinforced braided nylon with a solid polyvinyl chloride (PVC) inner core, stainless steel flex tubes made of braided stainless steel surrounding an inner tube of PVC or nylon, PVC flex tubes made of a PVC outer core that is usually braided with nylon and an inner core made of solid PVC, polymer-coated flex tubes with outer polymer-coated fibers and an inner PVC core, and the like.

The feeder supply line outlet 128 is configured to connect to, and to convey a fluid flow to, the spray arm 130. The feeder supply line outlet 128 and the spray arm inlet 131 have mating connectors, similar to the feeder supply line inlet 121 and the second tee outlet 118 mating connectors, as described above.

The elongated spray arm 130 comprises at least one internal fluid flow passage, a spray arm inlet 131, a spray arm outlet 138, an elongated casing body 139, an at least one handle 133, and, optionally, a spray arm shut-off valve 132. The spray arm inlet 131 is configured for connecting to the feeder supply line outlet 128 via mating connectors and for receiving a fluid flow from the feeder supply line outlet 128. The elongated casing body 139 is rigid and non-flexible. It comprises an upper generally straight portion that carries the handle 133 and a lower curved or arc-shaped portion 134 (FIG. 2) that has an arc that is complementary to the shape of a human body with a portion mimicking the human body shape from the pubic bone to the coccyx bone, which allows the user to correctly position the accumulation basin 150 carrying the sprayer 160. The casing body 139 receives a fluid flow from the spray arm inlet 131 and conveys fluid to the spray arm outlet 138. The spray arm outlet 138 is configured for conveying (either indirectly through a portion of the basin 150 or directly) a fluid flow to, the inlet port 161 (FIG. 4) of the sprayer 160 disposed within the accumulation basin 150. At least one of the spray arm outlet 138 or the interiorly-disposed sprayer 160 is configured for connecting to the accumulation basin 150 in a substantially water-tight connection. In an embodiment of the invention, the spray arm outlet 138 connects to a basin extension 142 fixedly attached to the basin 150 and the basin extension 142 directs the fluid flow to a quick release connector 144 to which the sprayer 160 is connectable. By usage of the quick release connector 144, it is easy to remove, clean, and replace the sprayer 160. In another aspect, the spray arm outlet 138 connects directly to the sprayer 160, preferably with a quick release connector, and the basin 150 attaches to the sprayer 160.

The handle 133 of the spray arm 130 allows the user to position the accumulation basin 150 for maximum comfort and collection and to direct the fluid spray from the spray head 169 for maximal cleansing. In the aspect shown in FIG. 1, the handle 133 has an upper end that is fixedly attached at an upper portion of the spray arm 130 and a lower end that is fixedly attached at a middle or mid-lower portion of the spray arm 130. In this aspect of the invention, the handle 133 comprises a two-loop or two-grip handle with two outwardly curved loops and an inwardly curved middle section or waist

136. In the aspect shown in FIG. 1, the inwardly curved middle section 136 is also fixedly attached to the spray arm 130. The dual grips allow the user to have optimum control of the positioning of the sprayer 160 and accumulation basin 150. In some aspects, shown in FIGS. 1, 2, 4, 9, 10, the inwardly curved middle section 136 is attached to the spray arm 130. Attachment of the middle section 136 to the spray arm 130 enhances the robustness of the structure. However, in another aspect shown in FIG. 3, the inwardly curved handle middle section 136 is unattached to the spray arm 130, and the handle is only attached at the upper end and at the lower end. In both of these aspects, the inwardly curved middle section 136 disposed between the two outwardly curved loops helps to guide the user in an advantageous positioning of the hands of the user and/or to encourage gripping of the loops.

In one aspect of the invention, the handle 133 includes an internal fluid storage passageway and/or reservoir, a fill port 135 preferably covered with a cap, and a fluid exit port. The handle's internal fluid storage reservoir is an interior cavity within the handle into which a secondary fluid is introduced through the handle fill port 135 and out of which the secondary fluid exits through a handle exit port. The fluid flow from the handle exit port is manually controlled by a handle shut-off valve 137 that retains the secondary fluid introduced into the fill port 135 in the storage reservoir or allows the secondary fluid in the storage passageway to flow into the lower portion of the spray arm 130. The fill port 135 allows the introduction of cleaners or disinfectants into the internal fluid storage passageway/reservoir for cleaning the accumulation basin 150, the sprayer 160, and the removal line 140. In another aspect medicaments, treatments, balms, and oils can be introduced into the fluid being sprayed onto the perineal area by the sprayer 160 via use of the fill port 135 and manual opening of the valve 137. Thus, the secondary fluid may comprise cleaners or health and beauty aids.

In another aspect of the invention, a safety lever 102 (FIGS. 2, 4) is installed that activates the shut-off valve 132 or a separate shut-off valve near the top of the spray arm 130. In the relaxed position, the valve is closed and no fluid flows into the spray arm 130. In the depressed position, the valve is open and fluid flows into the spray arm 130 and on to the sprayer 160. The inclusion of the lever 102 is a safety feature that provides the user with another layer of control. The lever 102 regulates the volume of fluid flow and so may also be used to maximize or minimize the fluid flow, thereby providing the user with volume enhanced control and additional comfort.

The sprayer 160 is disposed within the accumulation basin 150. The sprayer 160 comprises at least one internal fluid flow passage, an inlet port 161, and a spray head 169 having a nozzle matrix or assembly 168. The sprayer 160 is configured for receiving fluid flow from the spray arm 130. The sprayer 160 may be directly connected to the spray arm outlet 138 via mating connectors or otherwise connected to receive the fluid flow. In the preferred aspect, the basin 150 includes a tubing extension 142 (FIG. 4) configured with a quick release connector. The extension 142 is fixedly attached to or formed integrally with the basin 150. A basin quick release connector 144 is mated to the sprayer quick release connector at sprayer inlet 161, which may be mounted on a stem 162. The fluid flows from the sprayer inlet 161 through any stem 162 into the body of the sprayer 160 and into the spray head 169 and out a nozzle 168A, 168B of the nozzle assembly or nozzle matrix 168.

The spray head 169 comprises the nozzle assembly 168, which is configured to spray a fluid flow that sprays onto and washes the perineal area. The residual fluid, carrying any dirt, bacteria, or feces that has been washed away from the perineal area, is accumulated in the accumulation basin 150. This residual fluid is received by the accumulation basin 150, flows through the basin outlet drain 158 and into the inlet 141 of the removal line 140 and on to the drain fitting 170.

In a preferred aspect of the invention, the nozzle assembly 168 of the spray head 169 comprises multiple nozzles 168A (FIG. 4) that are directed upwardly to cleanse the perineal area and additionally comprises one or more nozzles 168B that are directly outwardly and/or downwardly to wash the interior surface of the accumulation basin 150. In one aspect the nozzles 168A, 168B may all disperse similar amounts of water at similar pressure. In another aspect, some of the nozzles 168A, 168B may vary from others of the nozzles 168A, 168B in spray strength. In a further aspect, some or all the nozzles 168A, 168B may provide a pulsating spray.

In one aspect of the invention, the spray head 169 may also optionally comprise a divider shield 167 (FIG. 4) that may be manually positioned by the user for additional comfort and affords the ability to protect delicate areas from an uncomfortably strong spray. The nozzles on the forward portion of the spray head 169 may be configured to spray with a lighter force than the nozzles on the rearward portion of the spray head 169. This aspect which may provide advantages to female users, who may position the divider shield 167 between the anus and the labia to provide a softer spray to the labial area and a more vigorous spray to the anal area. Usage of the divider shield 167 may also provide separation to solve actual or perceived hygiene issues.

Figure 4:
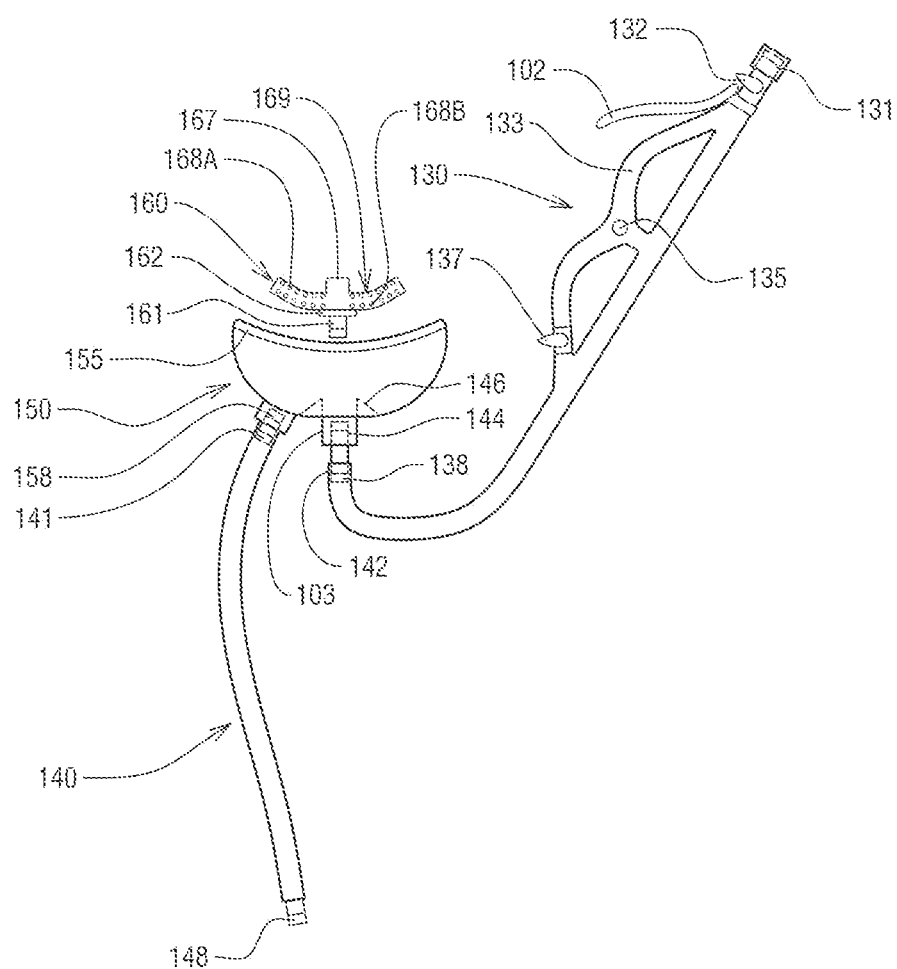
FIG. 4 is a side, partially expanded view of the accumulation basin, spray head, supply line, and water removal line of one embodiment of the present invention.
Figure 5:
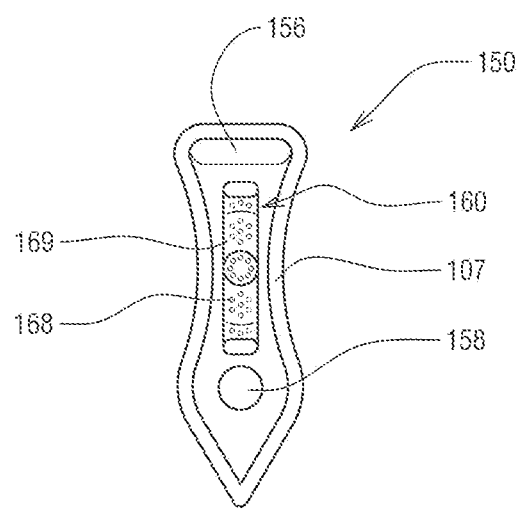
FIG. 5 is a top view of the accumulation basin and basin spray head of an embodiment of the present invention.
Figure 6:
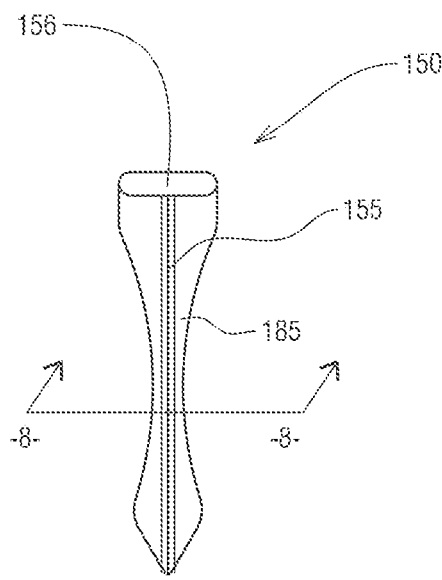
FIG. 6 is a top view of the expandable accumulation basin of another embodiment of the present invention in the relaxed, unexpanded state.
Figure 7:
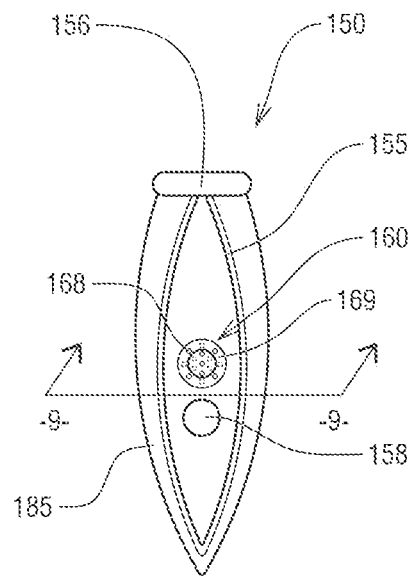
FIG. 7 is a top view of the expandable accumulation basin and basin spray head of FIG. 6 in the expanded or open state.
Figure 8:
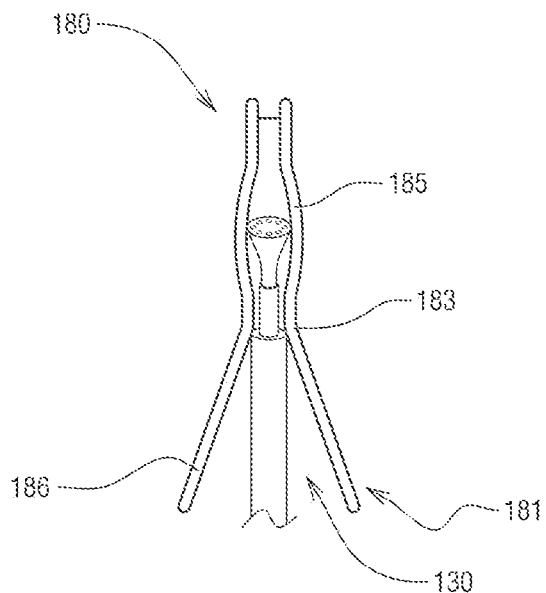
FIG. 8 is a side view of the buttocks spreader system of the expandable accumulation basin of FIG. 6.
Figure 9:
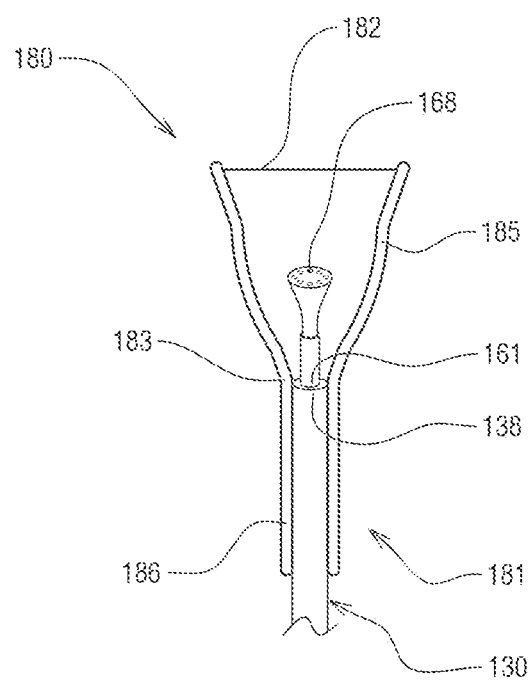
FIG. 9 is a side view of the buttocks spreader system of the expandable accumulation basin of FIG. 7.

The spray head 169 may be elongated as seen in FIG. 3-5 or may be circular as seen in FIGS. 1-2, 7-9, 20. In one aspect of the invention, multiple spray heads (or compound spray heads) may be included. In this aspect, each of the multiple spray heads 169 may be directed in the same or different directions, may have the same or different spray strengths, and may have the same or different spray patterns.

The accumulation basin 150 is a round or oblong concave open top, bowl-shaped vessel that is sized and configured to accommodate the sprayer 160 disposed internally of the basin 150. Preferably, the basin 150 is an oblong, concave, one-piece molded plastic container. The accumulation basin 150 comprises an inner surface, an outer surface, a rim 155 encircling the upper edge, and two openings, an input opening 151 and a basin outlet 158 (FIGS. 2, 4). The basin outlet 158 is configured to allow residual wash fluid to drain into the removal line 140 (or in the third, fourth, or fifth embodiments to drain into a toilet bowl. The input opening 151 is associated with facilitating the fluid flow from the spray arm 130 to the sprayer 160 in one of the aspects described above. The input opening may be in the bottom portion of the basin 150 or in the side of the basin 150 (FIG. 3).

The inner surface of the basin 150 is smooth to facilitate removal of the residual fluid and for cleaning. Particularly in the aspect in which the input opening is at the bottom of the basin, the inner surface of the basin 150 near the input opening 151 may have a raised portion 146 (FIG. 4) that minimizes backflow into the spray arm 130. The raised portion 146 encircling the input opening 151 may be formed as a mound or angled shape with a center depression into which the sprayer inlet 161 is connected.

In some aspects of the invention, the accumulation basin 150 may comprise a lid 154 that is sized and configured to fit onto or over the rim 155. In one aspect, the lid 154 is a separate element that may be snapped onto the rim. In another aspect, the lid 154 is hingedly attached to the accumulation basin 150, as seen in FIG. 1. In a further aspect, the lid 154 may have a recessed center portion. Filling the basin 150 and placing the lid 154 with the recessed center portion onto the accumulation basin 150 will force the water in the basin 150 out of the basin 150 and over the upper rim 155. This serves to rinse the outer surfaces of the basin 150.

In one aspect, the accumulation basin 150 is connected (either directly connected or connected via a portion of the sprayer 160) to the spray arm 130. This aspect facilitates easy removal of the basin 150 from the spray arm 130 for cleaning or replacement with a separate basin 150, such as may provide advantages when two members of the same household use a single personal perineal cleansing system. In another aspect, the accumulation basin 150 may be integrally formed with the spray arm 130 forming a one-piece spray arm and basin combination element. This aspect has less connections, and, thus, may provide a more robust solution. In the fifth embodiment of the bidet basin, the basin is supported by a basin support 320 pivotally connected to a handle assembly 310.

For comfort, in an aspect of the invention, the rim 155 of the basin 150 is covered with closed cell foam, rubber or rubber-like material, memory foam, memory foam covered in a pliant encasement for easy cleaning, or other soft material 107 (FIG. 5). Inclusion of a soft pliable material on the top rim 155 may facilitate a better fit against the body.

The flexible removal supply line 140 comprises at least one internal fluid flow passage, a removal line inlet 141 configured for connecting to (via mating connectors) and receiving a fluid flow from the basin outlet 158, a flexible line, and a removal line outlet 148. The flexible line is preferably a braided water line as described above having a diameter as large as or larger than the diameter of the feeder supply line 120. The removal supply line 140 extends from the basin outlet 158 to the drain inlet 171. The removal line outlet 148 connects to and conveys a fluid flow (the residual wash fluid and any waste) to a drain inlet 171 of the drain fitting 170 within the bottom of the shower or the bathtub or within the overflow drain of the shower/bathtub combination.

The drain fitting 170 comprises at least one internal fluid flow passage, comprises the drain inlet 171 configured for connecting to (via mating connectors) and receiving a fluid flow from the removal line outlet 148, and comprises an external cover 178. The external cover 178 supports the drain inlet 171. The external cover 178 includes one or more external drain holes providing access to the internal fluid flow passage. In the aspect in which the drain fitting is installed within the floor of the shower or bathtub, multiple external drain holes are provided. The external drain holes allow the shower spray water or bath water to drain into the internal fluid flow passage of the drainpipes, while the drain inlet 171 receives the residual water collected by the accumulation basin 150 (and transported by the removal line outlet 148) and directs the residual water through the external cover 178 to drain into existing plumbing drainpipes.

For convenience of attaching, using, and disconnecting all or parts of the personal perineal cleansing system 100, preferably one or more or all of the mating inlet/outlet combinations are quick release connectors. For example, if the feeder supply line inlet 121 and the second tee outlet 118 comprise a first mating quick release connector and if the drain inlet 171 and the removal line outlet 148 comprise a second mating quick release connector, the elements of the personal perineal cleansing system 100 between the water-ingress fitting 110 and the drain fitting 170 may be removed by merely activating the first and second quick release connectors. In another aspect, the sprayer 160 and the spray arm outlet 138 comprise mating parts of a quick release connector, which allows the sprayer 160 to be removed for easy cleaning of the sprayer 160 elements and of the interior of the accumulation basin 150.

FIG. 1 shows the first embodiment in which the handheld personal hygiene perineal cleansing system 100 is installed in a shower stall. An optional hook 106 is installed on the wall of the shower surround to enable the user to place most of the handheld personal hygiene perineal cleansing system 100 onto the hook 106 when not actively being used during a shower or for storage after completion of the shower. For example, if a quick release connector is installed at the connection between the second tee outlet 118 and the feeder supply line inlet 121 and another quick release connector is installed at the connection between the removal line outlet 148 and the drain inlet 171, all of the handheld personal hygiene perineal cleansing system 100 except for the water-ingress fitting 110 may be removed from the center of the shower and stored out of the way on the hook 106.

FIG. 2 shows the second embodiment in which the handheld personal hygiene perineal cleansing system 100 is installed in a bathtub/shower combination. The drain fitting 170 is installed into the existing bathtub drainpipe 109 by removal and replacement of the existing drainpipe cover. FIG. 2 also illustrates an aspect in which an upwardly-extending ridge 156 extends along the front edge of the accumulation basin 150. This safeguard ridge 156 allows a user to place the accumulation basin 150 safely and securely at the desired location toward the front of the perineal area, so that the handheld personal hygiene perineal cleansing system 100 is steadily positioned.

FIG. 3 shows the handheld personal hygiene perineal cleansing system 100 installed in a bathtub/shower combination, but in this aspect, the drain fitting 170 is installed into the existing overflow drain 101 of the bathtub by removal and replacement of the existing overflow cover. The existing overflow cover is replaced by the drain fitting 170 having a drain inlet 171 to which a removal line outlet 148 may be attached and having an external drain cover 178 configured with one or more external holes through which any bath water may overflow into the building's drain lines.

FIG. 3 additionally illustrates a handle variation in which a rigid handle is attached to the spray arm 130 only at the top and bottom of the handle. In the embodiment of FIG. 3, the inwardly curved middle section 136 of the handle 133 does not attach to the spray arm 130, the handle does not include a handle fill port 135 and a handle valve 137, and the spray arm 130 does not include lever 102 to activate the safety valve 132.

In the embodiment shown in FIG. 3, the accumulation basin 150 and the spray arm 130 are formed as a single, unitary element with no removable connection between the spray arm outlet 138 and the basin inlet 151.

FIG. 4 provides an expanded view showing the lower portion of the sprayer 160 from the spray arm inlet 131 to the removal line outlet 148. In this embodiment both the accumulation basin 150 and the sprayer 160 are connected by quick release connectors for easy removal of one or both for washing. In one aspect a first quick release connector 144 is fixedly attached to the interior of the lower portion 103 of the basin 150. The sprayer inlet 161 is configured as a mating second quick release connector and attaches to the basin quick release connector 144.

In one aspect, a projection or raised portion 146 extends above the bottom of the basin with the basin quick release connector 144 disposed within the raised portion 146. This functions to prevent waste from inadvertently being introduced into the spray arm system 130.

In FIG. 4, an extension 142 from the basin 150 is configured with a quick release connector, which is configured to attach to a mating quick release connector (spray arm outlet 138).

FIG. 5 illustrates a top view of the sprayer 160 within the accumulation basin 150. The front of the accumulation basin 150 is configured with an upwardly-extending ridge 156 for safety and stability. In the aspect shown, the upper edges or rim 155 of the accumulation basin 150 and the ridge 156 are covered in a soft material 107, as described above. In an aspect, seen in FIG. 5, the basin 150 may be molded unitarily from plastic resin.

FIG. 5 also illustrates the aspect in which the sprayer 160 is elongated and has multiple types of nozzles 168A, 168B (or a nozzle assembly/matrix 168 formed of multiple nozzles 168A, 168B) that are directed in one or more directions. For example, some nozzles may provide a pulsing spray, and some may provide a steady spray, and some nozzles may direct their spray upwardly for cleansing the perineal area and some may direct theirs outwardly for cleaning the basin 150.

In an exemplary installation, the handheld personal hygiene perineal cleansing system 100 of the present invention may be installed by first removing the existing showerhead 105 from the building's fluid flow pipe 111, typically by unscrewing the showerhead 105. Teflon tape is preferably placed on the threads of the ingress port 112 and the first tee outlet 119. The ingress port 112 is screwed onto the existing fluid flow pipe 111, and the showerhead 105 is screwed onto the first tee outlet 119. In the aspect in which a quick release connection is installed at the junction of the second tee outlet 118 and the feeder supply line inlet 121, the feeder supply line inlet 121 is attached via the quick release connection to the second tee outlet 118. Preferably, when purchased, the spray arm 130 is pre-connected to the feeder supply line 120, the accumulation basin 150 and sprayer 160 are pre-connected to the spray arm 130, and the removal line 140 is pre-connected to the basin outlet drain 158. If these connections are not pre-connected, these elements are connected during installation.

The existing drain cover is then removed and the inventive drain fitting 170 is installed with a drain inlet 171 quick release connector preferably disposed in the center of the external drain cover 178. The quick release connector of the removal line outlet 148 is then connected to the quick release connector of the drain inlet 171 to complete the assembly. Optionally, a wall hook may be installed for hanging at least a portion of the handheld personal hygiene perineal cleansing system 100 on a wall for storage.

In the shower installation embodiments, to use the handheld personal hygiene perineal cleansing system 100 of the present invention the water-ingress valve 115 is turned to prevent the fluid from entering the showerhead 105 and to direct the fluid into the feeder supply line 120. The spray arm valve 132 is opened to allow the fluid to enter the spray arm inlet 131. The fluid travels through the water-ingress fitting 110, through the feeder supply line 120, through the spray arm 130 and out of the sprayer 160 disposed within the accumulation basin 150. The accumulation basin 150 collects the residual fluid carrying any unwanted debris (such as fecal material, dead skin cells, dirt, and other waste material), which flows into the removal line 140 by gravity and then flows on into the drain fitting 170 to enter the plumbing drain that leads to the sewer system.

An additional aspect of the invention, a buttocks spreader 180, is shown in FIGS. 6-9. The handheld personal hygiene perineal cleansing system 100 is designed to clean the perineum, the region of the body between the legs and buttocks that reaches from the pubic symphysis to the coccyx, and the surrounding physical structures. However, in some situations the user may not be able to readily access the portion of the perineum between the buttocks. This may be because of mobility issues, medical problems, or structural issues. In this situation, the buttocks spreader 180 may be advantageously used to first separate the buttocks and then introduce a cleansing spray from sprayer 160.

The buttocks spreader 180 attaches to the end of the spray arm 130. As seen in FIGS. 6-9, the buttocks spreader 180 comprises a leg squeeze mechanism 181, an articulation point 183, an optional membrane 182, and opposing convertible sides 185 above the articulation point that convert from shut to open. The buttocks spreader 180 is used with a sprayer 160 having an optional front ridge 156 and a spray head 169. Additionally, the buttocks spreader 180 is used with the accumulation basin 150. However, in this embodiment, the accumulation basin 150 is laterally expandable and contractible. As in the other embodiments, the expandable and contractible accumulation basin 150 comprises a basin outlet drain 158 configured to convey the fluid to the removal line 140.

The expandable and contractible basin 150 of the buttock's spreader 180, in contrast to the non-expandable accumulation basin 150 of the first embodiment, has convertible sides 185 having sufficient flexibility that they can be expanded from a narrower, relaxed state via actuation of a leg squeeze mechanism 181. The leg squeeze mechanism 181 includes two levers 186 that articulate at articulation point 183 via movement of the user's legs. When the bottom portions of the levers 186 are in the relaxed position and extend outwardly as in FIG. 8, the spreader basin 150 is closed, as in FIG. 6, with the sides 185 contracted. This reduced form factor allows the user to position the expandable and contractible accumulation basin 150 more easily. When the bottom portions of the levers are moved inwardly as the user manually squeezes the levers with the upper legs, the convertible side walls 185 of the basin 150 move outwardly to create a wider basin and to allow the sprayer 160 to be exposed, as in FIGS. 7-9.

In one aspect, the expandable and contractible basin 150 further comprises a flexible membrane 182 (FIG. 9) disposed at the front and back of the expandable basin side walls that is expanded as the side walls 185 are expanded.

To use the buttocks spreader 180, the user connects the mating portions of any quick release connectors that have been disconnected, such as for storage. Then the user places the spreader accumulation basin 150 that is closed with the sides contracted between the buttocks with the leg squeeze mechanism 181 extending downwardly from the spreader basin 150 along the upper legs. The user squeezes his/her legs together, which activates the expandable side walls 185 of the spreader basin 150 to open to expose the sprayer 160. The user then initiates the fluid flow into the sprayer 160 via the spray arm valve 132 or the safety lever 102. As in the embodiment with the non-expandable basin, the spreader basin 150 collects the residual fluid and debris, which is directed into the removal line 140 and on into the drain via the drain fitting 170.

In a third embodiment, shown in FIGS. 10-11, the handheld personal hygiene perineal cleansing system 100 is configured for use while the user is sitting on the toilet. This embodiment may be preferred by some users, or, in some instances, a user may not have the physical ability to stand in the shower or bath/shower combination to use the personal perineal cleansing system.

Although some toilets 175 may already be configured in a manner that allows usage of the personal perineal cleansing system, most toilets 175 are likely to require installation of a riser 190 to allow usage. In one aspect, the riser 190 comprises a generally U-shaped seat 191 having a front opening 193 and a riser attachment mechanism to secure the riser 190 to the top of the toilet 175.

The riser attachment mechanism may be one or more mechanical attachments 198 or may be a securing portion 199 of the riser. For example, mechanical attachments may be bolts that attach the back of the riser using the conventional holes 177 disposed at the back of the toilet rim 176. Or in another example, mechanical attachments 198 may be clamps that extend from the bottom of the riser 190 to engage the top portion of the toilet bowl.

The securing portion 199 of the riser also functions to secure the riser 190 to the top of the toilet 175. For example, the riser securing portion 199 may be positioned at the bottom portion of the riser and may take the form of an insert that extends downwardly from the riser into the toilet bowl.

When installed onto a toilet, the generally U-shaped seat 191 of the riser extends along both sides and the back of the toilet rim 176. The U-shaped seat 191 provides an increased vertical dimension, as compared to the toilet without the riser to facilitate use of the personal perineal cleansing system. The riser seat 191 comprises a top surface, a bottom surface, and side walls that extend vertically from the seat top surface to the seat bottom surface. The side walls include both inner side walls disposed in the interior of the U-shape and outer side walls disposed on the exterior of the U-shape. Disposed at the front of the riser walls (at the peak of the arms of the U-shape, which is forward on the toilet) are rounded riser front walls 195 that define a riser front opening 193. The riser front opening 193 is sized and configured to allow insertion of the personal perineal cleansing system into the front of the riser 190. The riser front walls 195 preferably form a rounded front portion of the U-shape of the seat 191 portion of the riser 190.

In one optional aspect, side handles 197 may be included with the riser 190, which are preferably attachable and detachable from the riser, as needed. The inclusion of an option with side handles 197 may provide advantages to some users with disabilities or limitations, such as for use after back surgery to allow the user to ease into, and out of, a sitting position.

In a second optional aspect, as seen in FIG. 11, an inline water heater 122 is configured to warm or heat the water to be used. The inline water heater 122 may be warm the water through use of electric power, battery power, or mechanical power.

This third embodiment for use with a toilet 175, shares many similarities with the above-described embodiments. However, besides the difference in the usage of a riser 190, this embodiment differs in some aspects. The basin 150 may be designed with less vertical height to facilitate use. The angle of the curved portion 134 of the spray arm 130 may differ. And the basin 150 may be designed with a drain hole 149 instead of a removal supply line 140 and its accompanying components.

In this embodiment as in the embodiments above, the basin 150 is preferably oblong with rounded corners and with a smooth interior to facilitate cleaning. However, the basin 150 of this embodiment preferably has a reduced vertical height to facilitate insertion into the riser front opening 193. The basin 150 remains at least as tall as the sprayer 160, but the sprayer 160 may be inset lower into the bottom of the basin than in the earlier embodiments. Any of the types of sprayers 160 described above may be used.

Also, in contrast to the earlier embodiments, the basin 150 of this embodiment is not connected to a removal supply line 140, because the residual water and debris can drain directly into the toilet. In this case, the bottom of the basin 150 is configured with a drain hole 149 defined by drain hole edges 147. Drain hole 149 may merely be a hole cut into or molded into the bottom of the basin, may be a lined hole, may be a hole with an attached short tubular structure extending downwardly, or other opening providing access to the exterior of the basin.

The angle of the curved portion 134 of the spray arm 130 of this embodiment varies from the angle of the curved portion 134 of the spray arm 130 of the earlier embodiments, because the position of the user has changed from standing to sitting. Thus, in this embodiment, the angle of the curved portion 134 may be generally ninety-degrees. To use, the user grasps the handle 133 and pulls the basin holding the sprayer 160 toward the user.

In this embodiment of FIGS. 10-11, some elements may need to be adapted to attach to the available water supply pipe, with the selection of the water supply to be used based on factors such as bathroom layout, distances, water line availability, and aesthetics. For example, if the sink is near the toilet and the water line is available, the water-ingress fitting 110 may be connect to the water line under or near the sink, and the flexible feeder supply line 120 may be longer than in the earlier embodiments used in a shower or shower/bath. The supply line 120 may be run directly from under or near the sink, may extend through a hole in a cabinet supporting the sink, or may be installed in a manner appropriate for the bathroom layout, distances, and aesthetics. However, if the shower/bath combination is near the toilet, the personal perineal cleansing system may be attached to the showerhead 105, as described above. Or, as may be appropriate in a different layout, the water-ingress fitting 110 may be connected to the water piping behind the toilet 175 or under the toilet tank.

The handheld personal hygiene perineal cleansing system 100 may further include a hand plunger that attaches to or near the removal line outlet 148. The optional hand plunger is configured to allow a user with limited mobility to attach the removal line outlet 148 to the drain inlet 171 without bending over.

Figure 12:
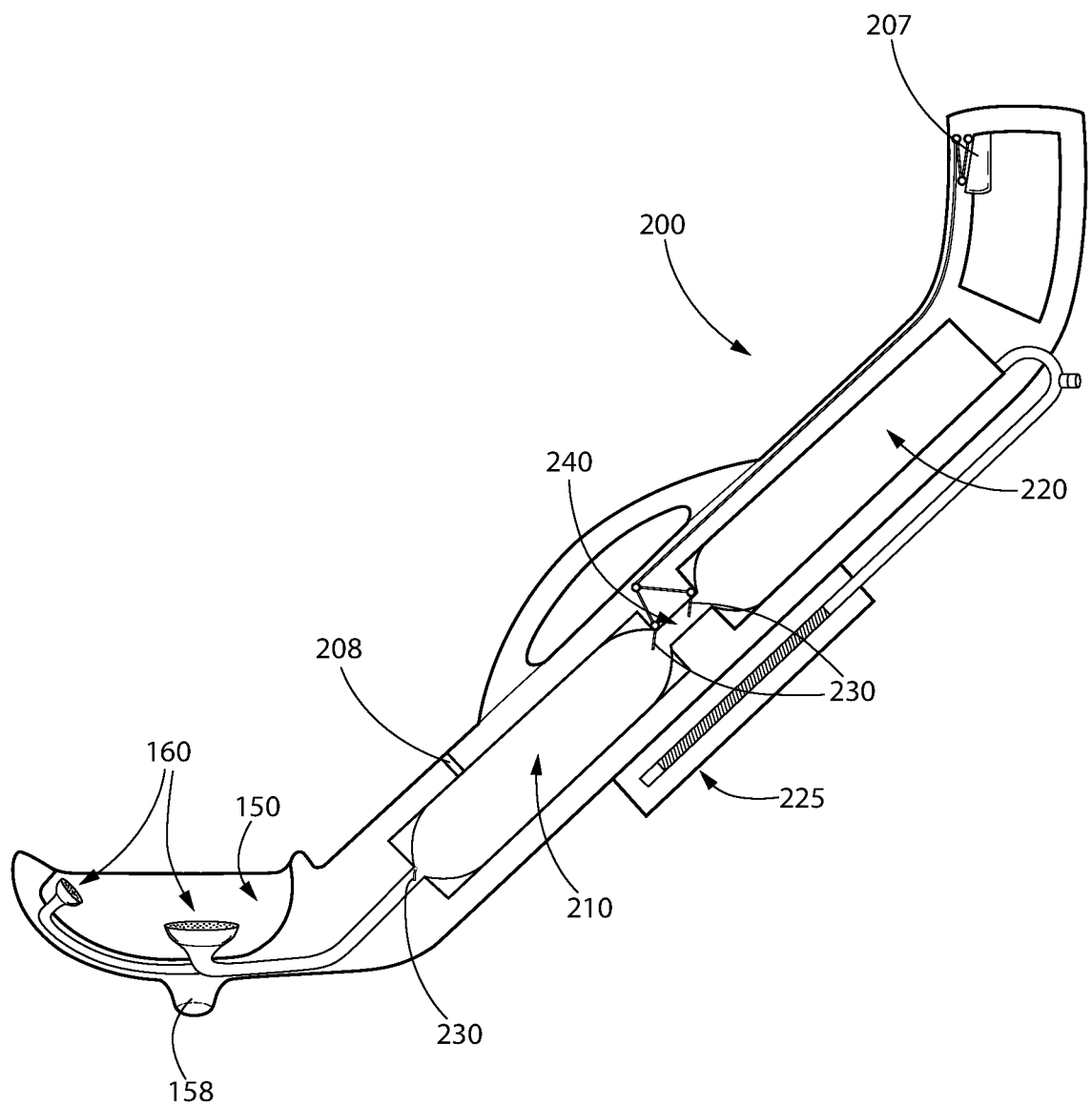
FIG. 12 is a cutaway view showing portions of the self-contained, portable handheld device in a fourth embodiment of the invention.
Figure 13:
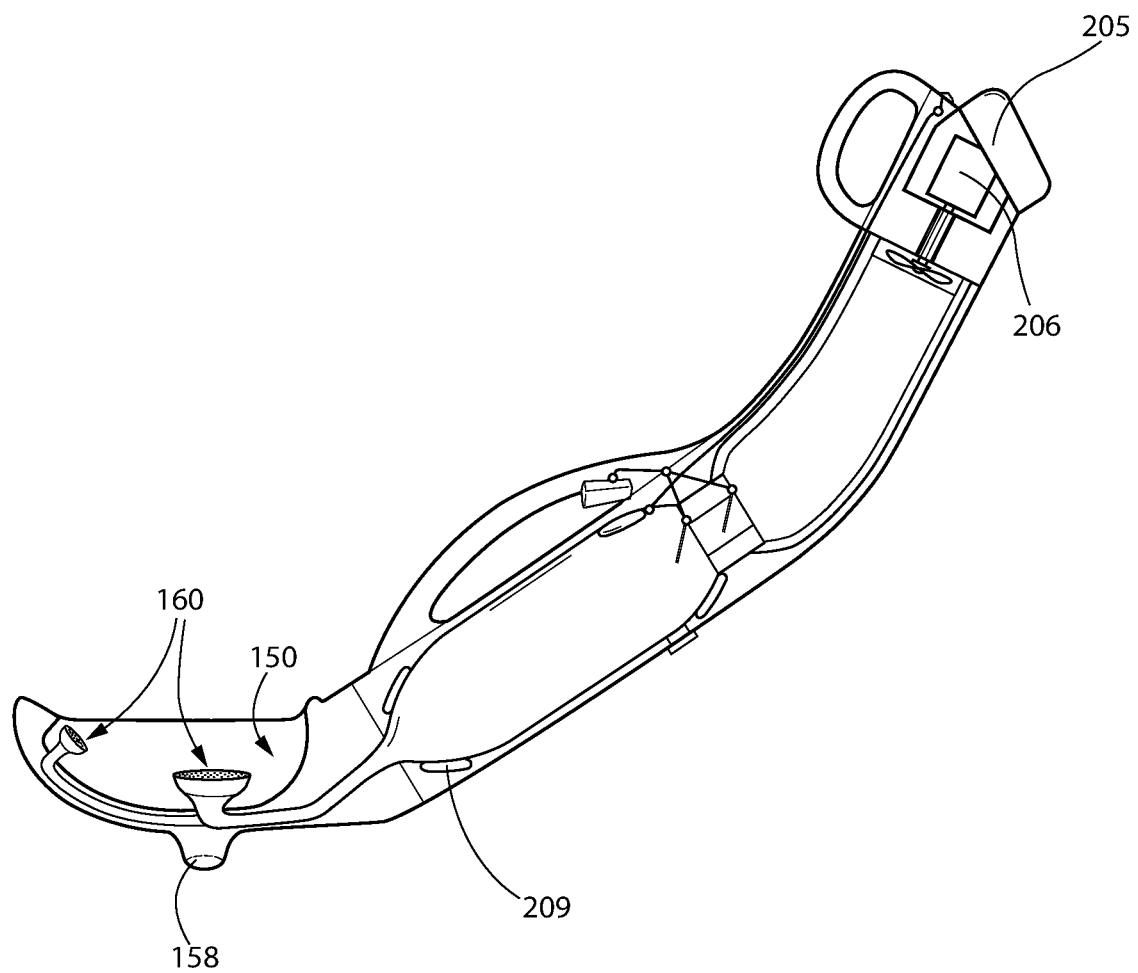
FIG. 13 is a cutaway view showing portions of the self-contained, portable handheld device in a fourth embodiment of the invention.

FIGS. 12-13 show a fourth embodiment, which is a portable, battery powered, forced air handheld personal hygiene device 200 that is suitable for use when a water line connection is not available, such as for camping or for long-haul trucking. A battery 205 (preferably rechargeable) supplies power to a motor 206 which is activated via a trigger valve release 207. An air pump handle 225 is connected to a pressurized air tank 220 (preferably with a sealed fan encasement) which is, in turn, connected to a water tank 210 via a PSI air pressure regulator 240. Valves 230 are disposed between the air chamber/tank 220 and the water tank 210 and are disposed between the water tank 210 and the sprayer system 160. In a preferred aspect, a battery-powered or mechanically powered water heating element 209 supplies heat to the water within the water tank 210 for comfort.

Figure 14:
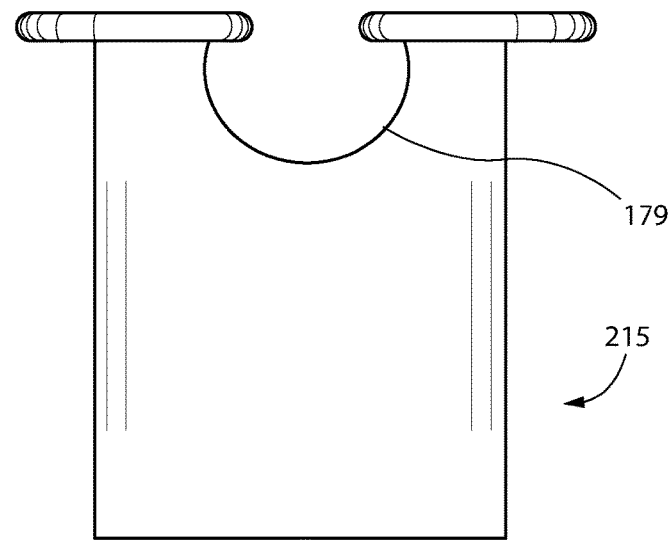
FIG. 14 is a front view of a portable toileting bowl or bucket for use with the portable self-contained handheld device of the fourth embodiment of the invention.
Figures 15, 16:
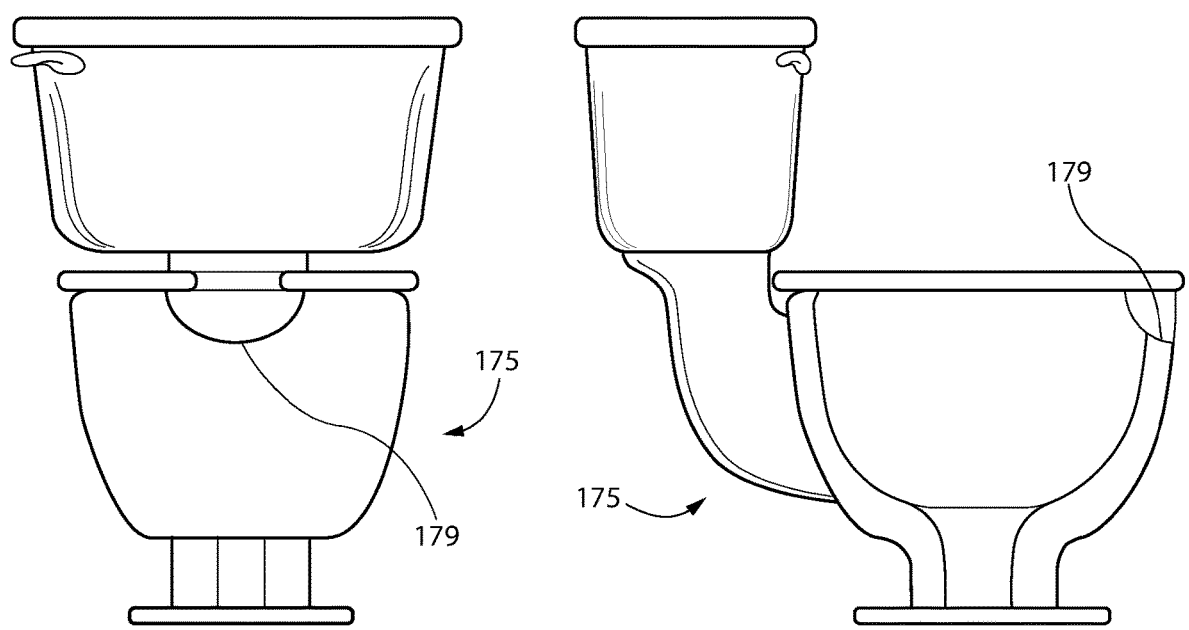
FIG. 15 is a front view of a modified toilet bowl for use with the handheld device of the third or fourth embodiment of the invention.
FIG. 16 is a side view of a modified toilet bowl for use with the portable self-contained handheld device of the third or fourth embodiment of the invention.
Figure 17:
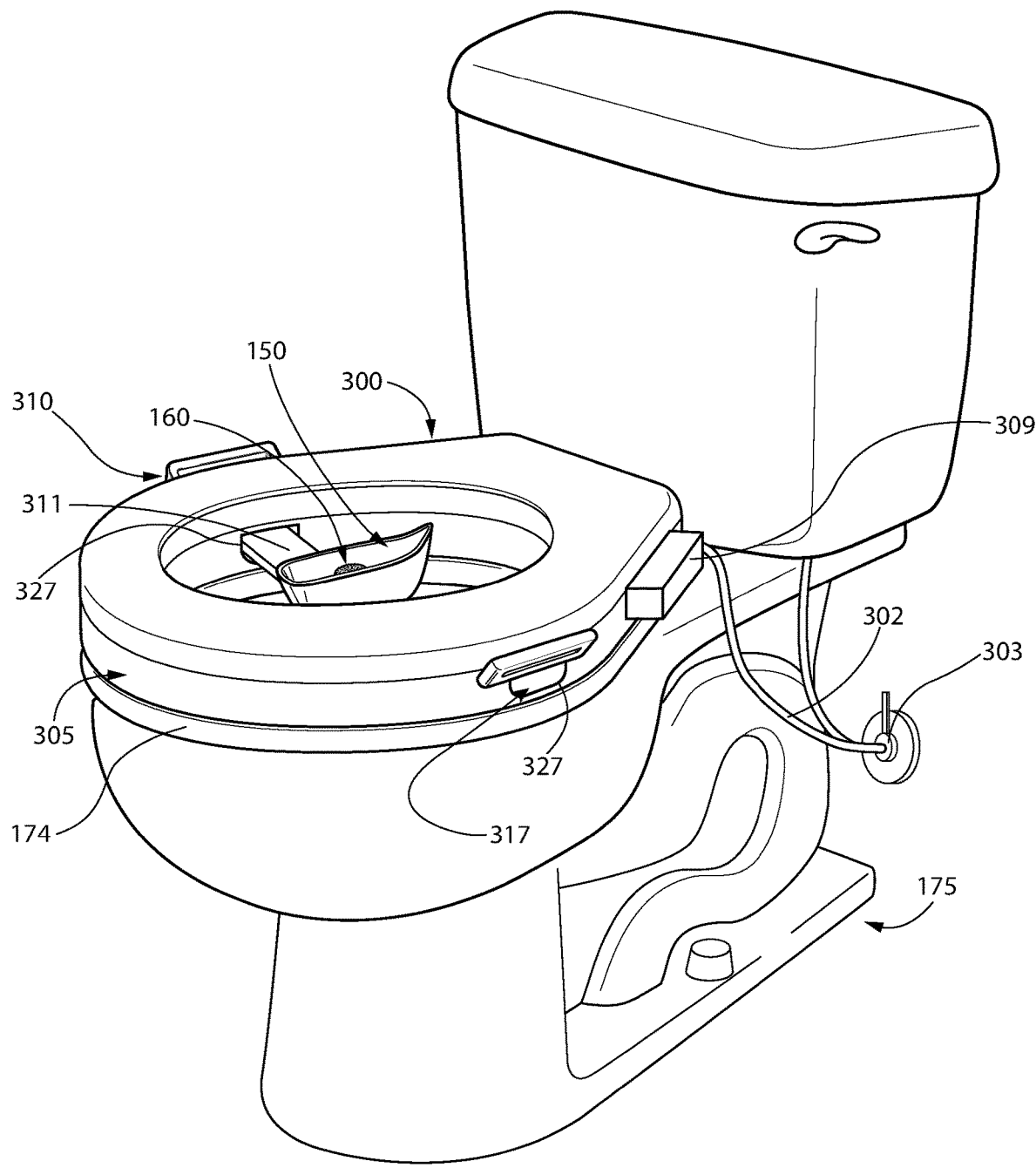
FIG. 17 is a perspective view of a standard toilet bowl with an attached secondary seat incorporating a bidet basin of the fifth embodiment of the invention.
Figure 18:
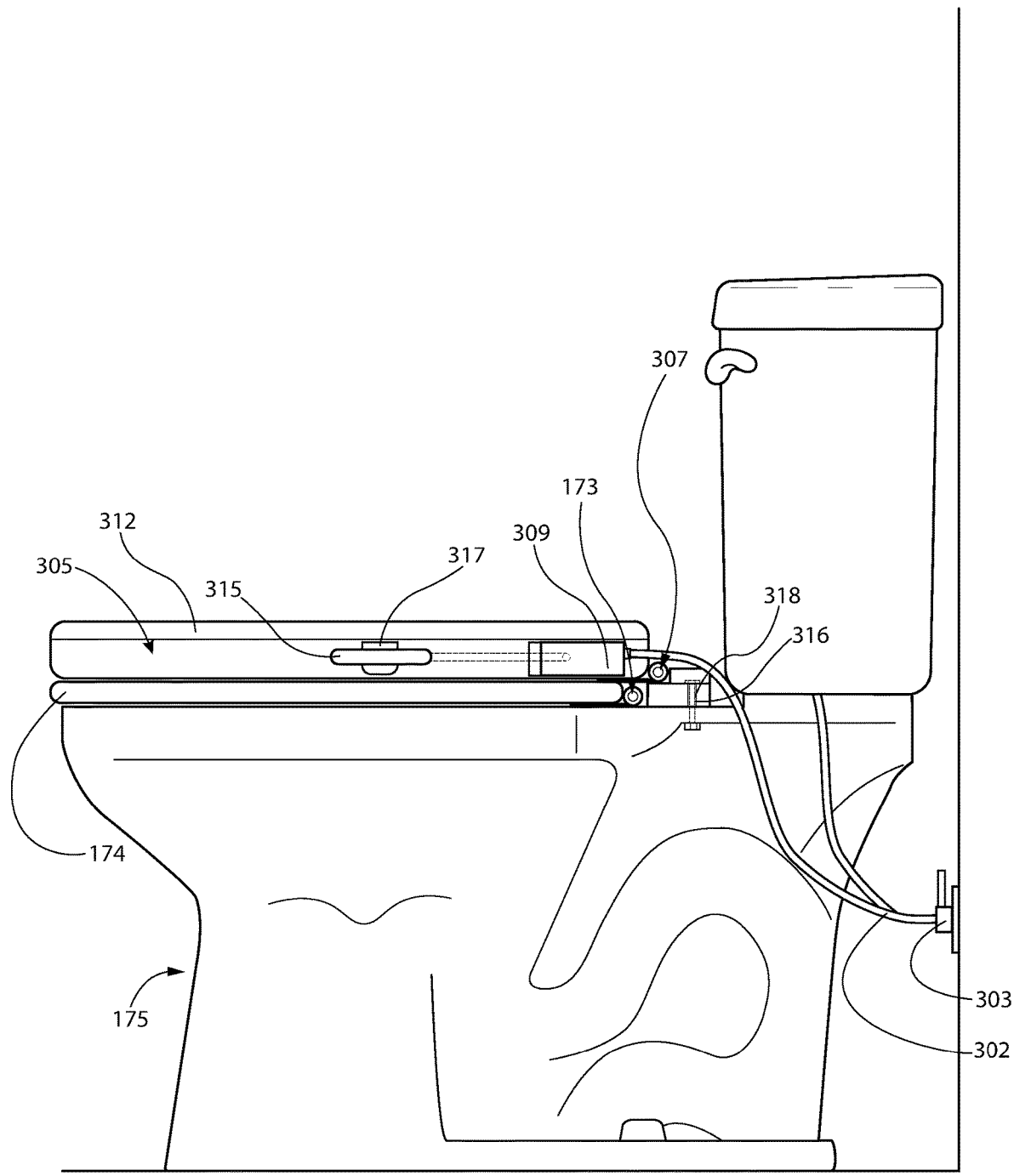
FIG. 18 is a side view of a standard toilet bowl with a lowered primary and lowered secondary seat, with the secondary seat incorporating a bidet basin of the fifth embodiment of the invention.

This fourth embodiment may be used with the riser (described above) on a standard toilet, with a portable receptacle 215 (FIG. 14) with a center front opening 179, or with a specialized toilet with a center front opening 179 (FIGS. 15-16).

The fifth embodiment of FIGS. 17-22 discloses a basin bidet 300 comprising a basin 150 carrying a sprayer 160 incorporated into a secondary toilet seat 305, which is installed above the standard primary toilet seat 174. Therefore, the basin bidet 300 is an add-on to a standard toilet 175. The primary toilet seat 174 remains usable, but when perineal cleansing is desired, the secondary toilet seat 305 can be folded downwardly (to a horizontal orientation) to rest on the primary toilet seat 174, whereby a cleansing water spray can be provided. In a preferred aspect, the primary and secondary seat are sold as a unit to facilitate interoperability.

The basin bidet 300 includes the basin 150 (generally described above) with one or more internal sprayers 160 (generally described above) disposed within the basin 150. The basin 150 comprises an open top, bowl that is sized and configured to accommodate the sprayer assembly 160. The bottom portion of the basin 150 is configured with a drain hole 149 defined by drain hole edges 147. In the basin bidet embodiment 300, the basin 150 is suspended (via basin support 320) in the middle of the toilet bowl (when the secondary seat 305 is folded down) with the drain hole 149 positioned generally in the middle of the toilet bowl to allow drainage of used water and any carried residual material to drain into the toilet bowl. In one aspect of the invention, the basin 150 is removable and replaceable with a second basin 150, such as may be desired when the cleansing system 100 of the present invention is used by multiple members of one household. In this aspect, a basin quick connect 304 (FIG. 21) is disposed between the basin 150 and the basin support 320.

The basin 150 is raised and lowered by a handle assembly 310. The handle assembly includes a right and left grip 315, a right and left handle stem 311, a right pivot mechanism 319, and a left pivot mechanism 319. The right grip 315 is attached to the right handle stem 311, generally at or near the distal end of the stem 311. The left grip 315 is attached to the left handle stem 311, generally at or near the distal end of the stem 311. The grips 315 are positioned beyond the outer edges of the secondary toilet seat 305 so as to be reachable by the user.

The proximal end of the right handle stem is rotatably attached to a right side of a centrally disposed basin support 320 at stem-to-basin support hinge 313. The proximal end of the left handle stem is rotatably attached to a left side of the centrally disposed basin support 320 at stem-to-basin support hinge 313. The basin 150 is attached to the basin support 320. Preferably the basin 150 is fixedly attached to the basin support 320, but in another aspect of the invention the basin support 320 is rotatably attached to the basin support 320 to allow the basin to rotate up to 30 degrees forward or backward to allow a more personalized fit of the basin against the body of the user.

A distal portion of each of the handle stems 311 is pivotally attached to the secondary toilet seat 305. The secondary toilet seat 305 includes right and left vertical slots 317 (defined by right and left slot edges 327) comprising openings in the right and left sides of the secondary toilet seat 305. The slots 317 are wide enough to accommodate the width of the distal portion of the handle stem 311 and are tall enough to accommodate the vertical movement of the distal portion of the handle stem 311 as it pivots upward and downward. A pivoting sleeve or other pivot mechanism 319 (FIG. 21) may be used at this pivot point. A distal portion of the right handle stem 311 is accommodated by the right slot with a right pivot mechanism pivotally attaching the distal portion of the right handle stem to the secondary toilet seat within the right slot. A distal portion of the left handle stem is accommodated by the left slot with a left pivot mechanism pivotally attaching the distal portion of the left handle stem to the secondary toilet seat within the left slot.

In an aspect of the invention, the right and left slots 317 also extend horizontally at least forwardly or backwardly. This allows forward and backward adjustment of the basin 150. The horizontal extension is disposed within the secondary toilet seat 305. In this aspect, the water line 302 has sufficient length to allow the forward and backward movement of the basin 150. The forward and backward adjustment allows the user to position the basin 150 in a more precise manner to accommodate various body sizes and shapes.

A water line 302 (with at least one fluid flow passage therethrough) is connected to a household water supply pipe at shutoff valve 303. The water line 302 extends from the shutoff valve 303 to a spray head 169 within the basin 150. It is sufficiently long enough to run from the shutoff valve 303 to the secondary toilet seat 305, to preferably run within the interior of the secondary toilet seat 305, to preferably run within one of the left or right handle stems 311, and then to attach to the spray head 169 within the sprayer system 160 to provide water for cleansing. The water line 302 is preferably configured similarly to the flexible feeder supply line 120 described above. Preferably the user can access a switch in switch assembly 301 to activate the flow of water from the water line 302 to the spray head 169. In another aspect of the invention, the switch assembly 301 also controls the volume of water flow. In this aspect, the user is able to select a higher spray flow, or a lower spray flow, based on his or her preferences.

For the comfort of the user, preferably the secondary toilet seat has an upper layer of cushion 312, such as foam, gel, gel cellular material, or other soft cushiony material. Also, to add comfort to the user, a water heating device 309 is preferably included. The water heater 309 heats the water in the water line 302 or in a small reservoir within or near the water line 302. The water heater 309 is installed beside the water line 302 or may be an inline heater. The water heater 309 may be battery powered, mechanically powered, or electrically powered.

Figure 19:
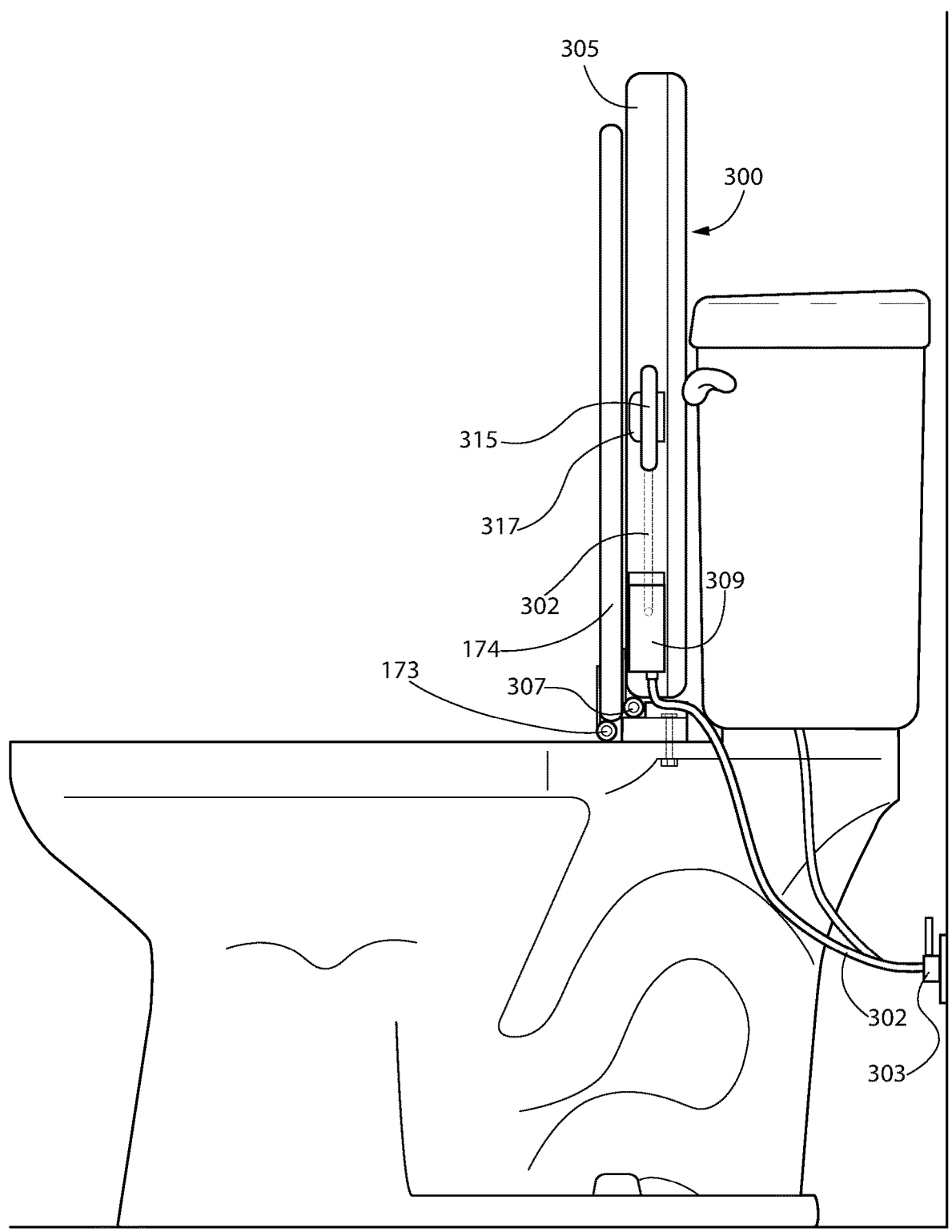
FIG. 19 is a side view of a standard toilet bowl with a raised standard toilet seat and a raised secondary seat in which the secondary seat incorporates a basin bidet of the fifth embodiment of the invention.
Figure 20:
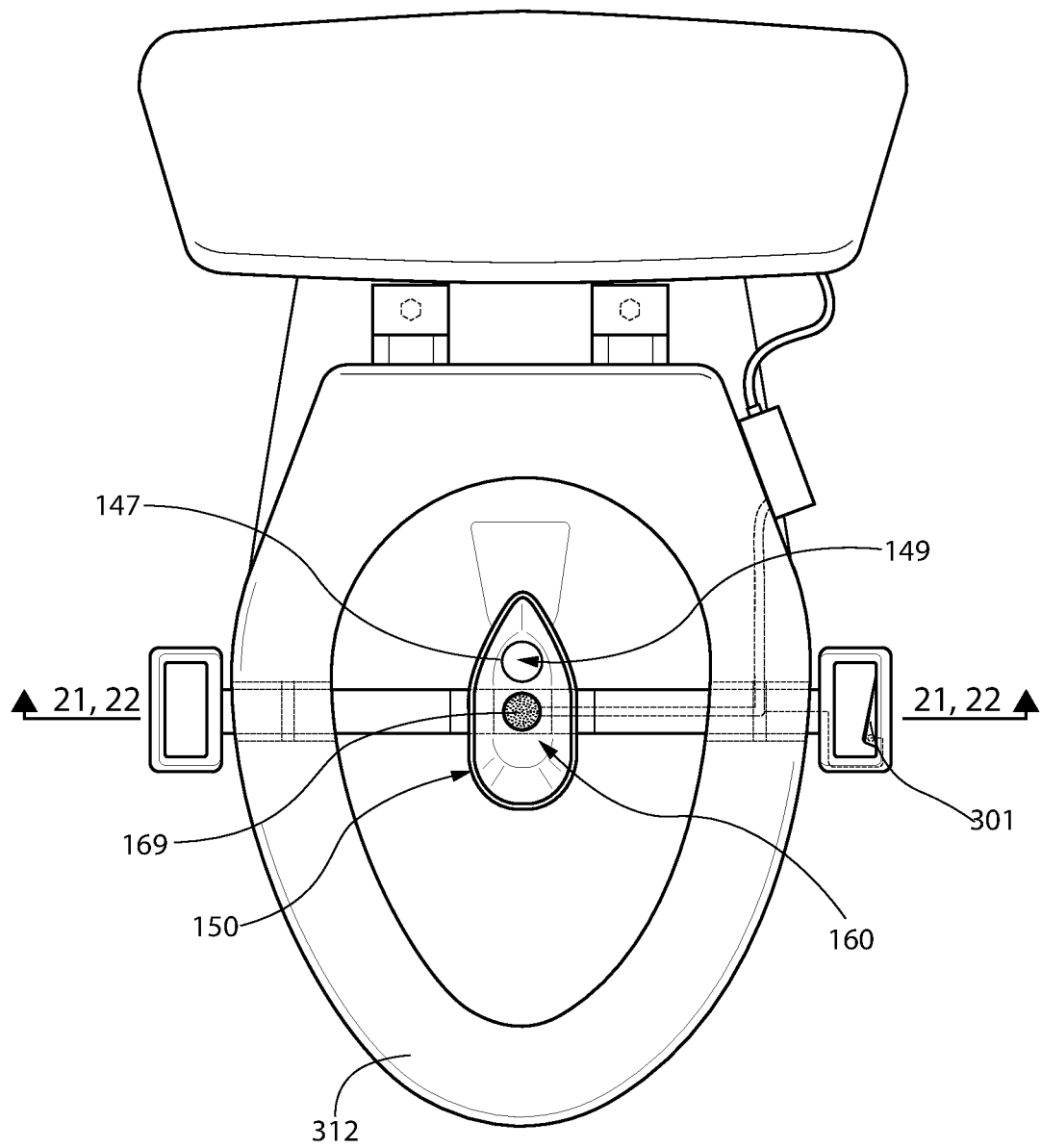
FIG. 20 is a top view of a standard toilet bowl with a lowered primary and lowered secondary seat, in which the secondary seat incorporates the bidet basin of the fifth embodiment of the invention.
Figure 21:
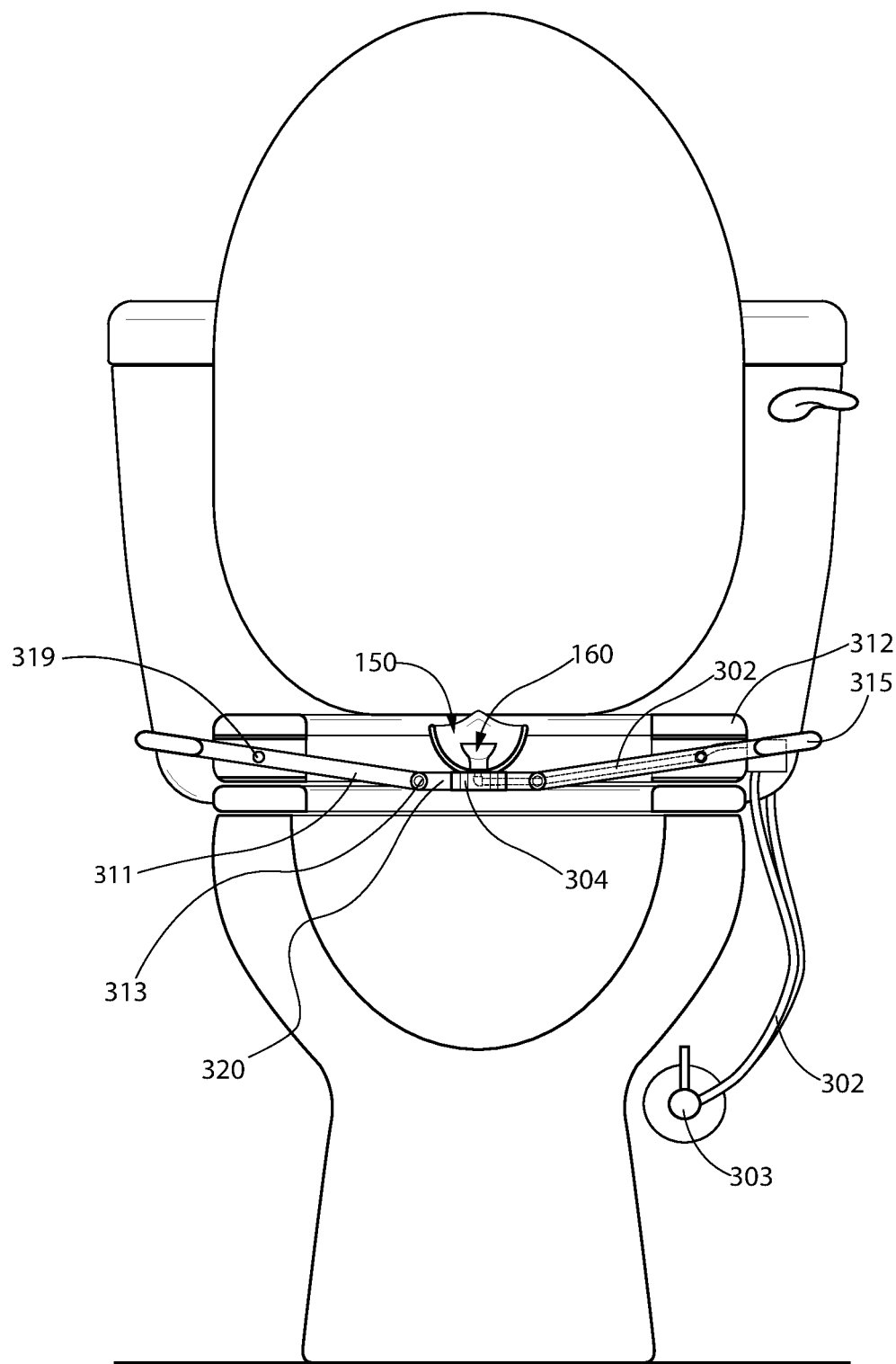
FIG. 21 is a front view taken from view line 21, 22 of FIG. 20 of a standard toilet bowl with a lowered primary and lowered secondary seat of the invention showing the incorporated basin in the downward, unextended position.
Figure 22:
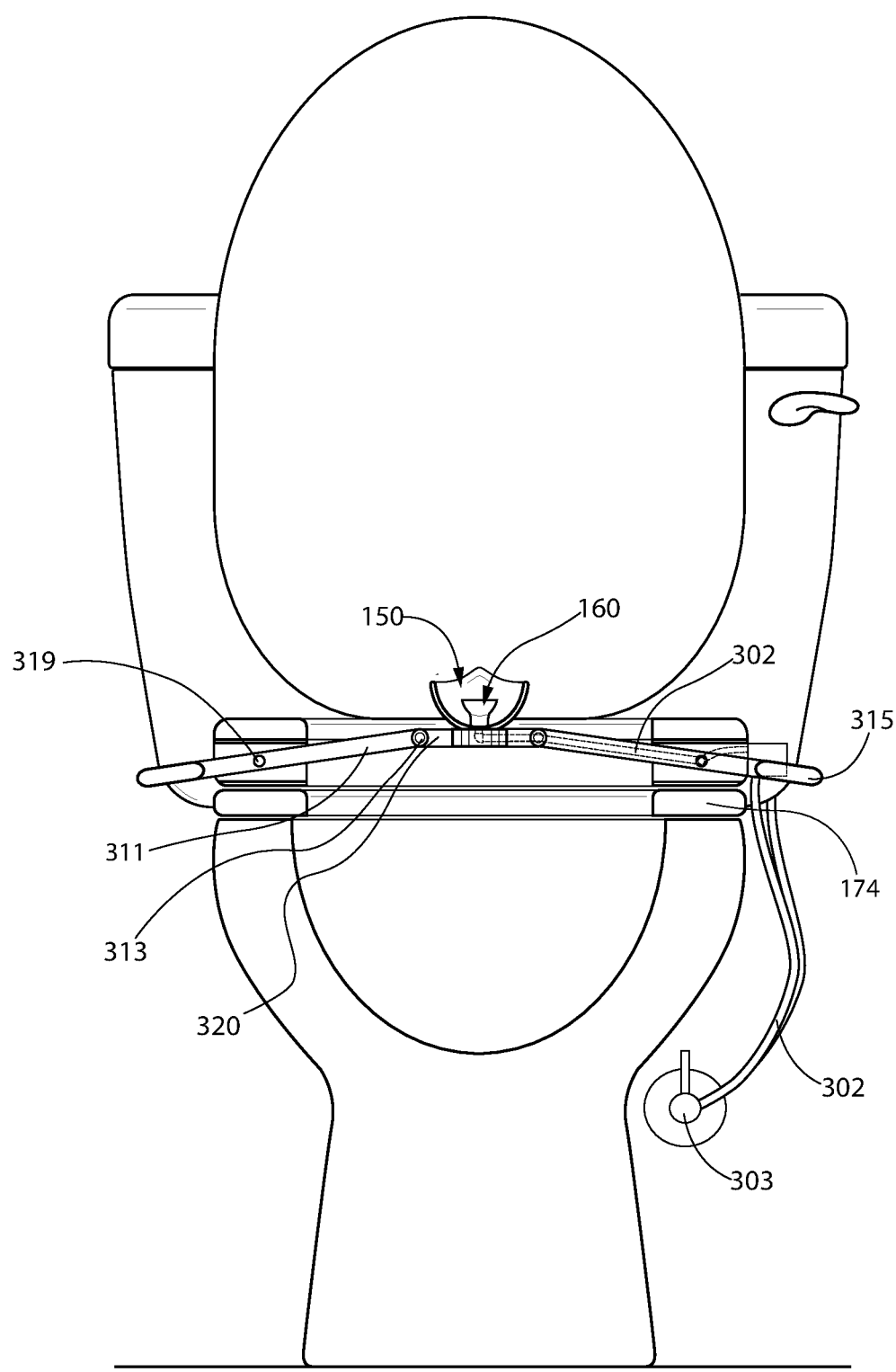
FIG. 22 is a front view taken from view line 21, 22 of FIG. 20 of a standard toilet bowl with a lowered primary and lowered secondary seat of the invention showing the incorporated basin in the upward, extended, body-engaging position.

Before use, the basin bidet system 300 may be arranged as shown in FIG. 19 with both the primary toilet seat 174 and the secondary toilet seat 305 in a rotated upwardly, vertical orientation. To use the basin bidet system 300, the user first lowers the primary toilet seat 174 (which rotates at primary rear hinge 173 to a horizontal orientation) and may first sit on the primary toilet seat 174 to use the toilet as usual. If the user wants to take advantage of the additional cleansing provided by the basin bidet system 300, the user stands up and folds the secondary seat 305 downward (rotating at rear hinge 307 to achieve a horizontal orientation) with the secondary seat 305 then resting on, and adjacent to, the primary seat 174. In this position, the grips 315 are positioned angled toward the top of the slot 317 with the basin lowered in the middle of the toilet bowl, as seen in FIG. 21. The user sits on the secondary seat 305 and engages the grips 315 with his/her hands to push downwardly, which causes the grips 315 to move downwardly and the distal portion of the handle stem 311 to pivot at pivot mechanism 319, which brings the proximal portion of the right and left handle stems 311 upward. This causes rotation at both the right stem-to-support hinge 313 and the left stem-to-support hinge 313, which raises the basin support 320 that is suspended between the two stem-to-basin hinges 313. Raising the basin support 320 in turn raises and elevates the attached basin 150. The basin 150 can be elevated to or above the level of the top of the secondary seat 305.

To achieve a desirable fit, the user controls the amount of upward motion of the basin 150 by the amount of force applied to the grips 315. Most users will raise the basin 150 to make a relatively tight seal with the perineal area and buttocks to allow for effective cleaning along with containment of the water sprayed plus any dirt, bacteria, or fecal residual material. In the aspect in which the right and left slots 317 have a horizontal extension, the user also can move the handle grips 315 slightly forward or backward to attain a comfortable fit.

After the preferred fit is achieved, the user triggers a switch of switch assembly 301 to allow the water to travel from the water line 302 to spray out of the spray head 169 of the spray assembly 160. The water cleanses the area of the body to which it is directed, and thereby rinses away any urine or fecal material. When the hand grips 315 are released, the basin 150 sinks downward (either by the force of gravity, or in some aspects by encouragement of a spring). The residual rinse water and carried material then drains from the interior of the basin 150 by gravity though the basin outlet drain hole 149 and drains into the toilet bowl. The secondary seat 305 may be left in the folded down, horizontal position to continue draining for a few seconds to a few minutes, if desired. Then both the primary and secondary seat may be folded upward into the position shown in FIG. 19, if desired.

Preferably the primary toilet seat 174 and the secondary toilet seat 305 are manufactured and sold as a unit to promote full functionality and interoperability. However, the secondary toilet seat 305 can optionally be sold as an add-on to a conventional primary toilet seat 174.

The personal perineal cleansing basin bidet of the fifth embodiment is easy to install. The water line 302 is connected to a convenient household water line, such as at a shutoff valve 303. A tee may be inserted at the shutoff valve 303 if needed to accommodate a separate water intake for the toilet 175. The combination primary and secondary toilet seat unit has a rear portion with a channel 316 aligned with the channel at the rear of the toilet bowl, which is typically used for receiving a screw or pin 318 to hold the toilet seat onto a ceramic toilet bowl. A longer pin 318 may be included in the installation kit, if needed. The pin 318 is inserted through the toilet channel and through the combination primary and secondary seat unit channel 316 and secured by a securing nut.

The sixth embodiment of FIGS. 23-30 discloses a basin 150 (generally described above) carrying a sprayer 160 (generally described above) incorporated into a basin-incorporated toilet seat 400. By use of a basin-repositioning system, the position of the basin 150 is adjustable between a horizontally disposed functional position (shown in solid lines in FIGS. 23-26) and a vertically disposed storage or non-operative position (shown in broken lines in FIGS. 23-26). A sliding basin-mounting assembly 410 includes two handles 412 connected to a crossbar 411 that stretches across the middle of the toilet seat 400. The crossbar 411 serves as a basin support which holds the basin 150 in a generally central position over the water of the toilet bowl. The top of the basin 150 is approximately at the height of the top surface of the seat portion or slightly higher. The water supply to the basin 150 preferably runs within the crossbar 411 and then into the sprayer assembly 160 at the side or bottom of the basin 150.

The basin-incorporated toilet seat attachment mechanism may be one or more mechanical attachments 198. For example, mechanical attachments may be bolts that attach the back of the toilet seat using the conventional holes 177 disposed at the back of the toilet rim 176. Or in another example, mechanical attachments 198 may be clamps that extend from the bottom of the toilet seat to engage the top portion of the toilet bowl.

To manually move the basin 150 between the lower functional position and the upper vertically disposed storage position, the handles 412 may be grasped by the user and the handles (attached to the crossbar 411 that carries the basin 150) may be moved backwardly and then upwardly. To move the basin 150 from the upper position to the lower position, the movement is repeated in the opposite order. Optionally, the basin 150 may be moved between the upper and lower positions and back again, when needed, by mechanical means with the power supplied by batteries or electricity. In this case the change in position may be actuated by a switch that the user engages, which may be disposed on any convenient location.

Figure 25:
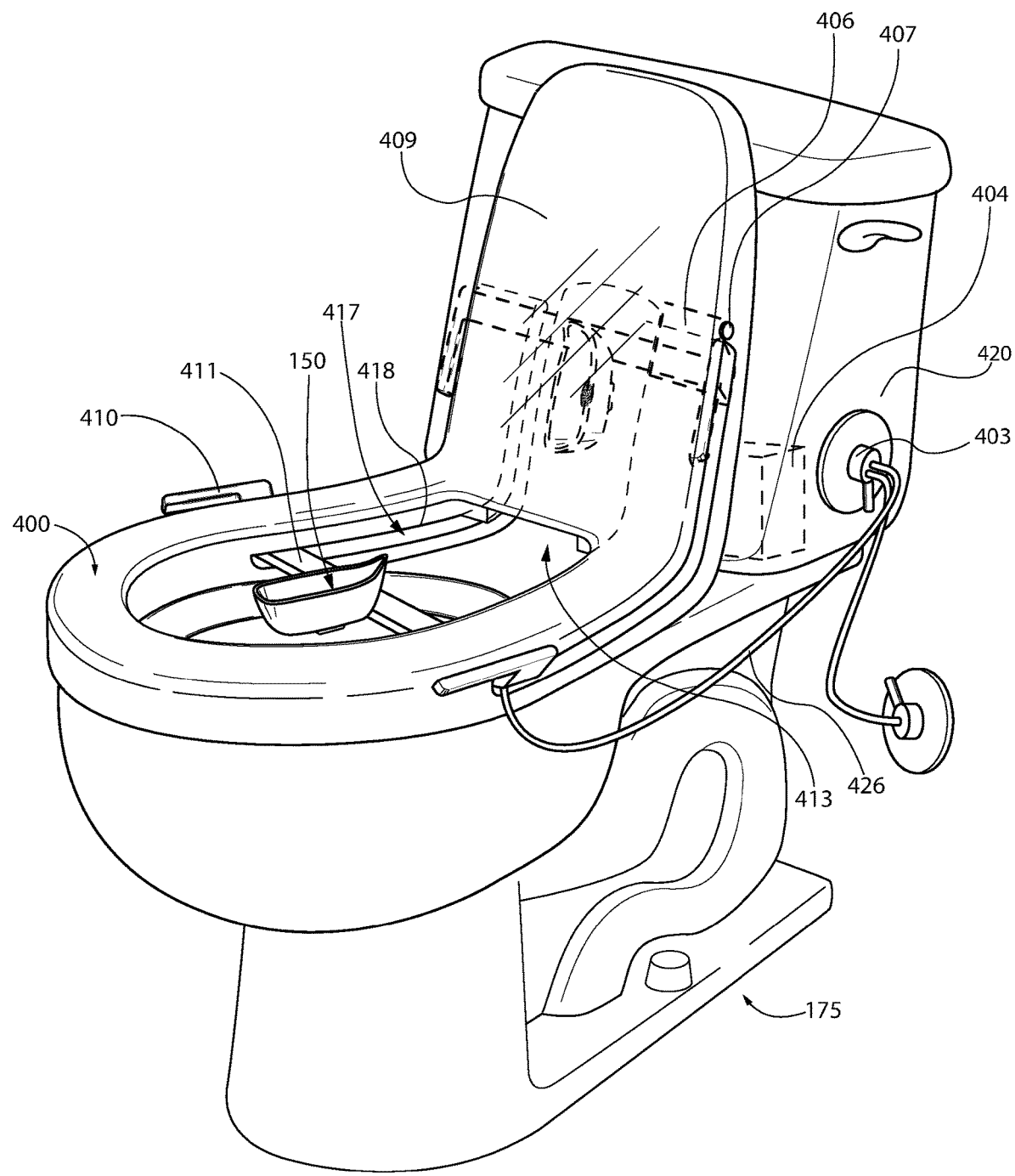
FIG. 25 is a perspective view of the sixth embodiment showing the sliding bidet basin in the functional position disposed within the horizontal portion of the modified toilet seat and showing a water supply originating at the modified toilet tank.

In an aspect of the invention, when the crossbar 411 is in the upper storage position, a position-securing device 405, 406 may be used to retain the crossbar 411 securely. The position-securing device may be any device as known in the art. For example, FIG. 23 illustrates a position-securing device comprising a friction locking mechanism 405. In another example, FIG. 25 illustrates a position-securing device comprising a releasable mechanical locking mechanism 406 with a push-button release 407.

When observed from the side, the basin-incorporated toilet seat 400 is generally a rounded L-shape with one leg of the L formed by a horizontal portion 415 and the other leg of the L formed by a vertically extending portion 414. The horizontal portion 415 and the vertical portion 414 do not meet at a sharp angle but meet at a rounded area, junction 416. The rounded junction 416 allows the crossbar 411 to be slid from the horizontal portion 415 through the rounded junction 416 and into the vertical portion 414 and back again. Though the horizontal portion 415 and vertical portion 414 meet at a rounded or curved area, the angle between the forward area of the horizontal portion 415 and the upper area of the vertical portion may be 90 degrees or may preferably be slightly to somewhat greater than 90 degrees, such as from 91 degrees to 130 degrees to allow the user to recline at least slightly. A recline angle of greater than 90 degrees (as illustrated) may provide a greater level of comfort, as the user can lean back slightly, which may be particularly important to users with back issues. The degree to which the recline angle can be increased above 90 degrees is constrained by the amount of room behind the toilet bowl and in front of the water tank. The basin-incorporated toilet seat 400 is usable on a standard toilet, but the angle of recline is limited. In an aspect of the invention, the basin-incorporated toilet seat 400 is used on a specialized toilet that allows the user to recline more than a standard toilet. The specialized toilet is fabricated with a water tank 420 that has a narrower top and a wider bottom, as seen in FIGS. 23, 25, 26.

When observed from the top, the horizontal portion 415 of the basin-incorporated toilet seat 400 has a shape that corresponds to the shape of the top of the toilet bowl onto which it will rest, as does a standard toilet seat. Though illustrated as sized to correspond to a standard round toilet seat, the horizontal portion 415 may equally well be fabricated to correspond to the size and shape of a standard elongated toilet seat. (When measured from the middle between the two standard bolt holes for securing a toilet seat to the front edge of a toilet bowl, a standard round toilet seat typically is from 16 to 18 inches long and a standard elongated (or oval) toilet seat is from 18-20 inches long.) The horizontal portion 415 may have two opposing horizontal sides and a front that generally form a U shape. Or, alternatively, the horizontal portion 415 may have two opposing horizontal sides with an open front, as is known in the toilet seat art. In the lower functional position, the basin 150 (supported by a center portion of the crossbar 411) is held between the right and left opposing horizontal sides of the horizontal portion 415 in the middle of the open toilet bowl above the waterline.

Figure 24:
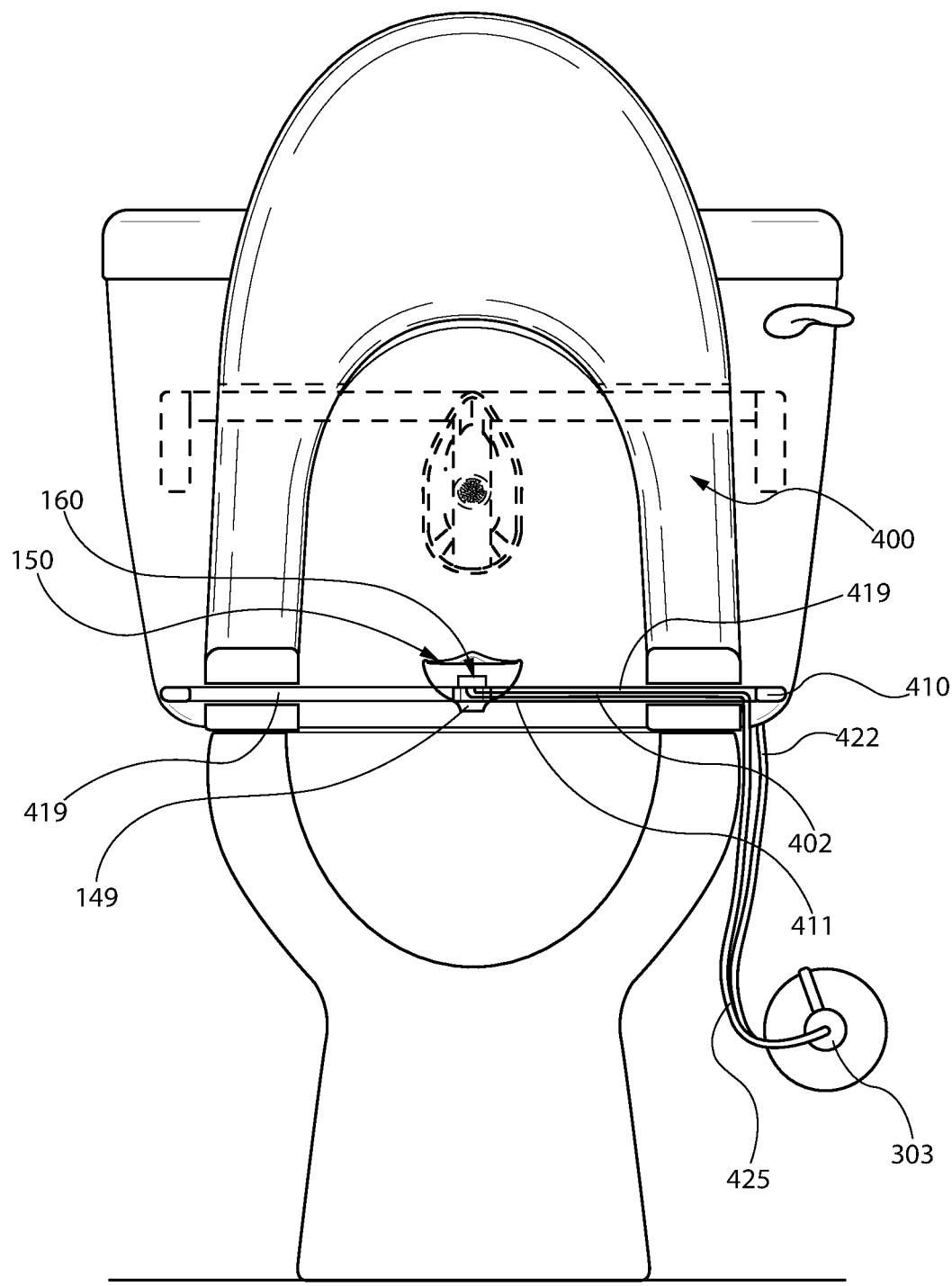
FIG. 24 is a cutaway view of the sixth embodiment taken from line 24-24 of FIG. 23 showing the sliding bidet basin in the functional position disposed within the horizontal portion of the modified toilet seat.
Figure 26:
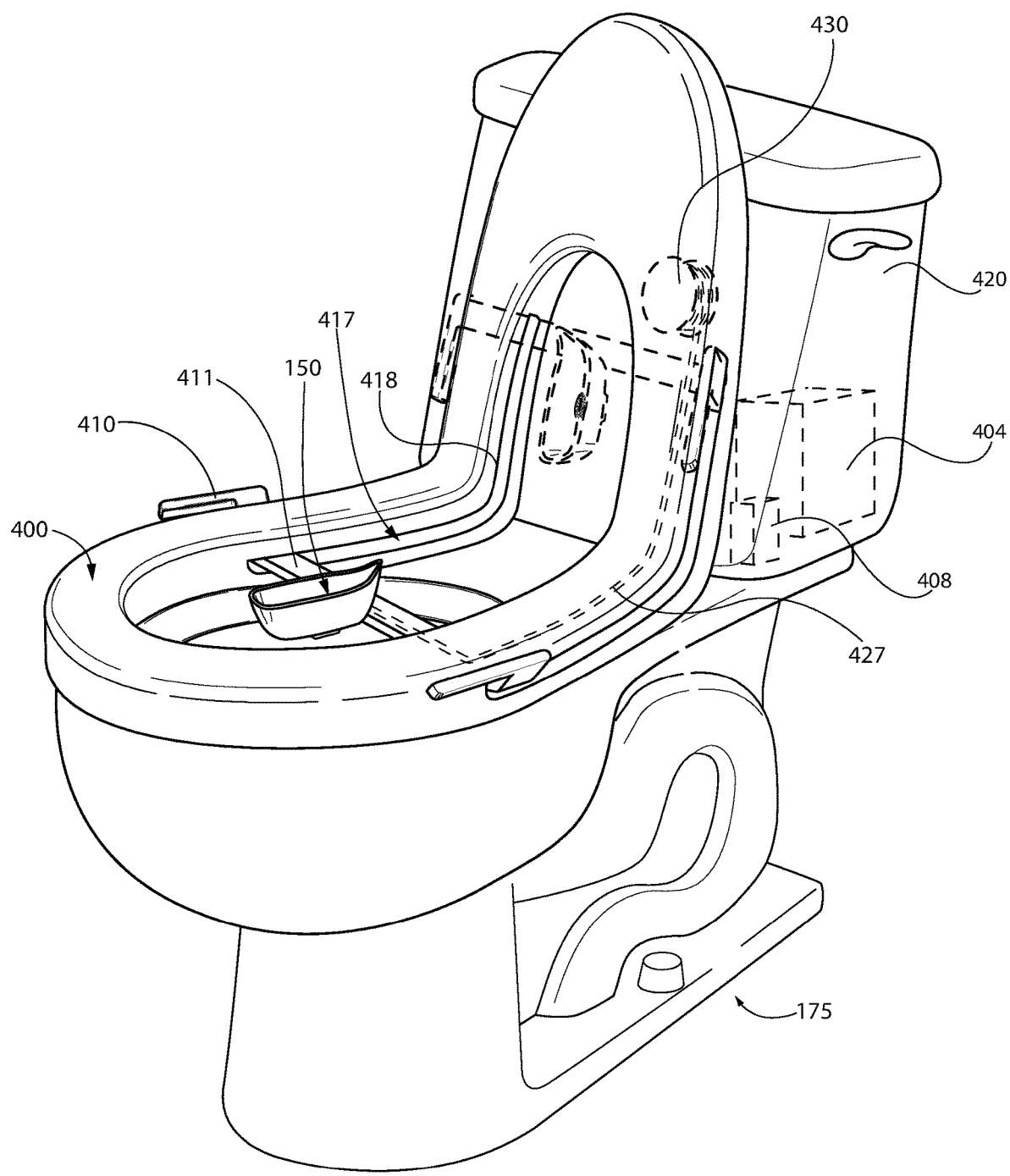
FIG. 26 is a perspective view of the sixth embodiment showing the sliding bidet basin in the functional position disposed within the horizontal portion of the basin-incorporated toilet seat and showing a water supply originating at the modified toilet tank and integrated into the basin-incorporated toilet seat.

The inventive toilet seat's vertically extending portion 414 may have two opposing vertical sides and a top portion disposed between the two opposing vertical sides that generally form a U shape, as illustrated in FIGS. 23, 24, 26. In another aspect of the invention, the vertically extending portion 414 has two opposing vertical sides with an open top. In a further aspect, the vertically extending portion 414 may include a solid facade 409 that is disposed in front of the opposing vertical sides, which provides an appearance of a solid back while including an opening at the bottom 413 (between the opposing vertical sides) to allow the crossbar 411 and the basin 150 to enter and to come to rest behind the facade 409. FIG. 25 also shows that the vertical portion may be shorter than shown in FIGS. 23, 24, 26, with the minimum height being sufficient to allow the basin 150 to be received and stored.

In an aspect of the invention, the upward surface of the horizontally extending portion 415 may be padded with a cushion 322 for comfort. In the aspect that includes a facade 409, the front surface of the facade 409 may be padded with cushion 322. In the aspect without a facade 409, the two opposing vertical sides may be padded with cushion 322.

Both the toilet seat's horizontal portion 415 and vertically extending portion 414 are configured with channels 417 defined by channel edges 418. The channels are configured to receive the crossbar 411 and to allow the crossbar 411 to slide to cause the basin 150 mounted at the center of the crossbar 411 to move from the functional position, through the rounded junction 416, and upward to the storage position (and vice versa). In one aspect of the invention, the crossbar 411 is manually slid by the user. In another aspect the movement is motorized. The left side channel 417 extends rearwardly from a midsection of the left opposing horizontal side of the horizontal portion 415, continues through the left rounded junction 416, and extends upwardly to a midsection of the left side of the vertical portion 414. The left side channel 417 extends laterally (side to side) from the outer edge to the inner edge of the left opposing horizontal side, from the outer edge to the inner edge of the left rounded junction 416, and from the outer edge to the inner edge of the left side of the vertical portion 414. The left side channel 417 is configured to accommodate the left end member 419 of the crossbar 411. Similarly, the right side channel 417 extends rearwardly from a midsection of the right opposing horizontal side of the horizontal portion 415, continues through the right rounded junction 416, and extends upwardly to a midsection of the right side of the vertical portion 414. The right side channel 417 extends laterally from the outer edge to the inner edge of the right opposing horizontal side, from the outer edge to the inner edge of the right rounded junction 416, and from the outer edge to the inner edge of the right side of the vertical portion 414. The right side channel 417 is configured to accommodate the right end member 419 of the crossbar 411.

The right and left side channels 417 are disposed a sufficient distance above the bottom surface of the toilet seat 400 to be functional and are disposed below the top surface of the toilet seat a sufficient distance to be functional. This creates an intermediary track (generally disposed at the horizontal middle of the horizontal portions 415 of the seat) through which the crossbar 411 can efficiently slide. The channels 417 are preferably lined with a smooth material to facilitate the sliding of the crossbar 411.

In the aspect in which the basin re-positioning system is manually movable, the crossbar 411 extends laterally from a right handle 410 through the right channel 417, across the top of the toilet bowl, through the left channel 417 and to the left handle 410. The handles 410 may be a forward projecting bar (as shown) that forms a right angle with the ends of the crossbar 411. In other aspects of the invention the handles 410 may be shaped in other ways as known in the art, such as a t-shaped handle, a knob, or an outwardly extended handle, which may be easier to grasp.

In the aspect of the invention in which the basin 150 is mechanically moved between the storage position and the functional position, the crossbar 411 may have handles 410 as described above or may be formed without handles 410. In this aspect, an electronic activator/switch is conveniently placed to allow the users to activate the motor of the basin re-positioning system.

Figure 27:
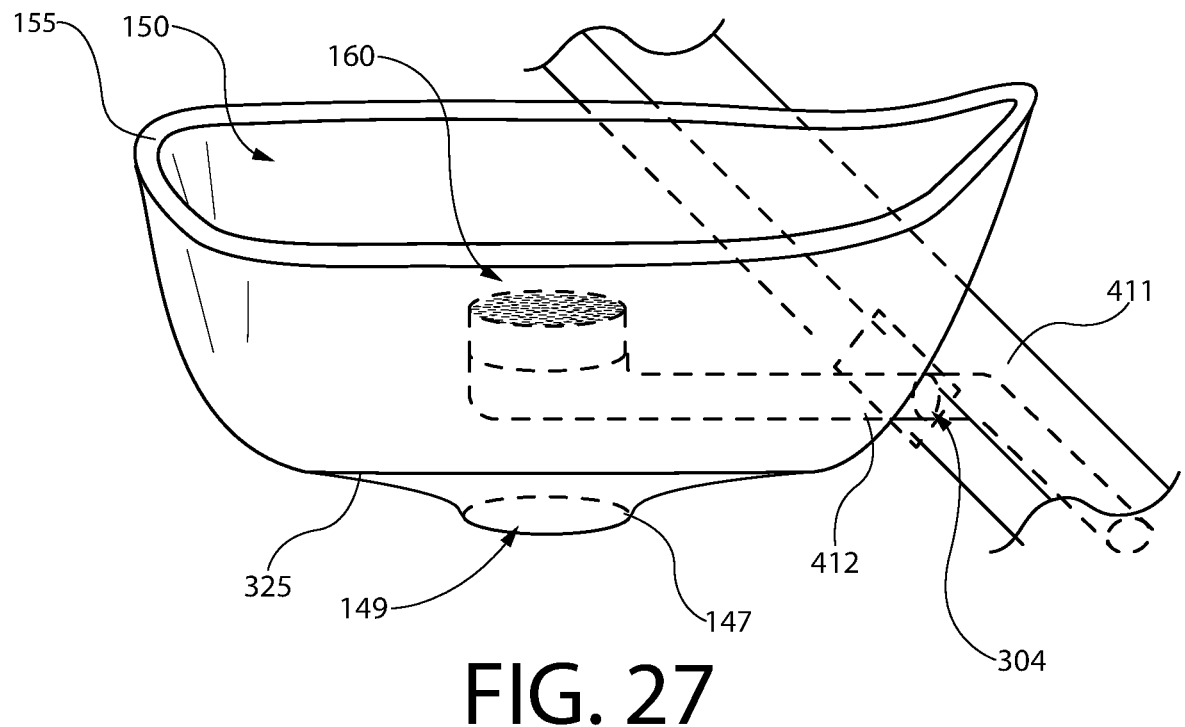
FIG. 27 is a perspective view of an aspect of the sixth embodiment showing a bowl-like bidet basin positioned on and supported by the mounting bar.
Figure 28:
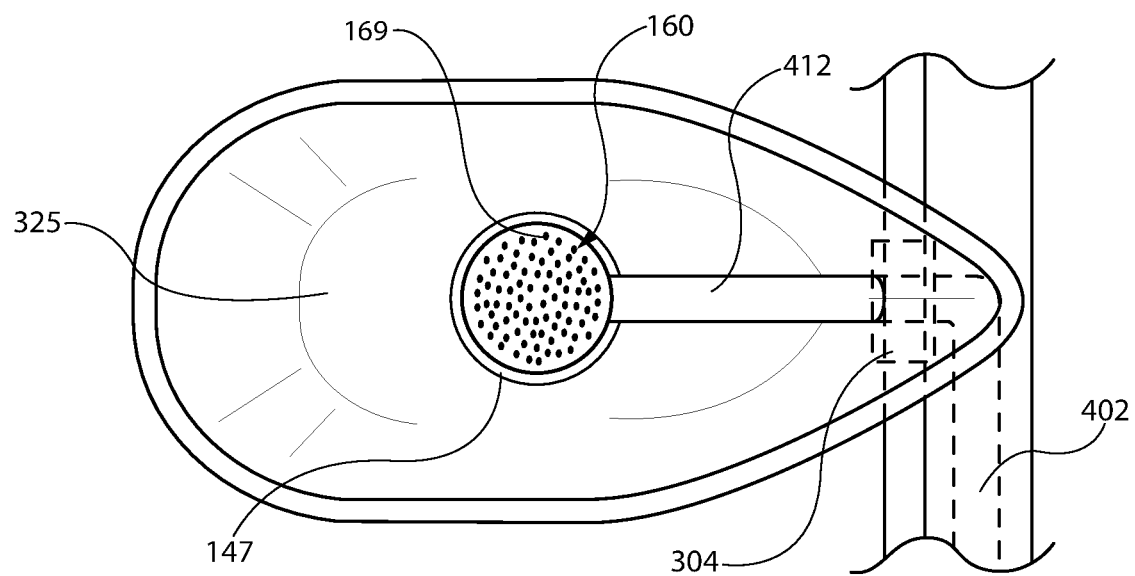
FIG. 28 is a top view of the aspect of the sixth embodiment shown in FIG. 27.
Figure 29:
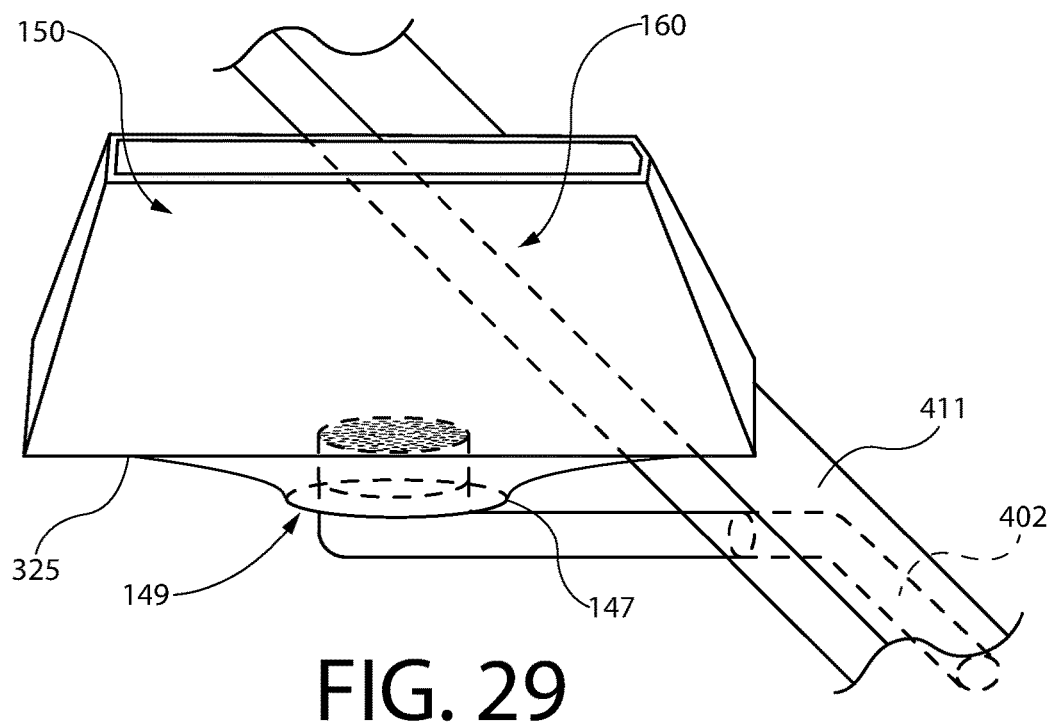
FIG. 29 is a perspective view of an aspect of the sixth embodiment showing a bidet basin with a narrower top opening and a wider bottom with a bottom drain that is positioned on and supported by the mounting bar.
Figure 30:
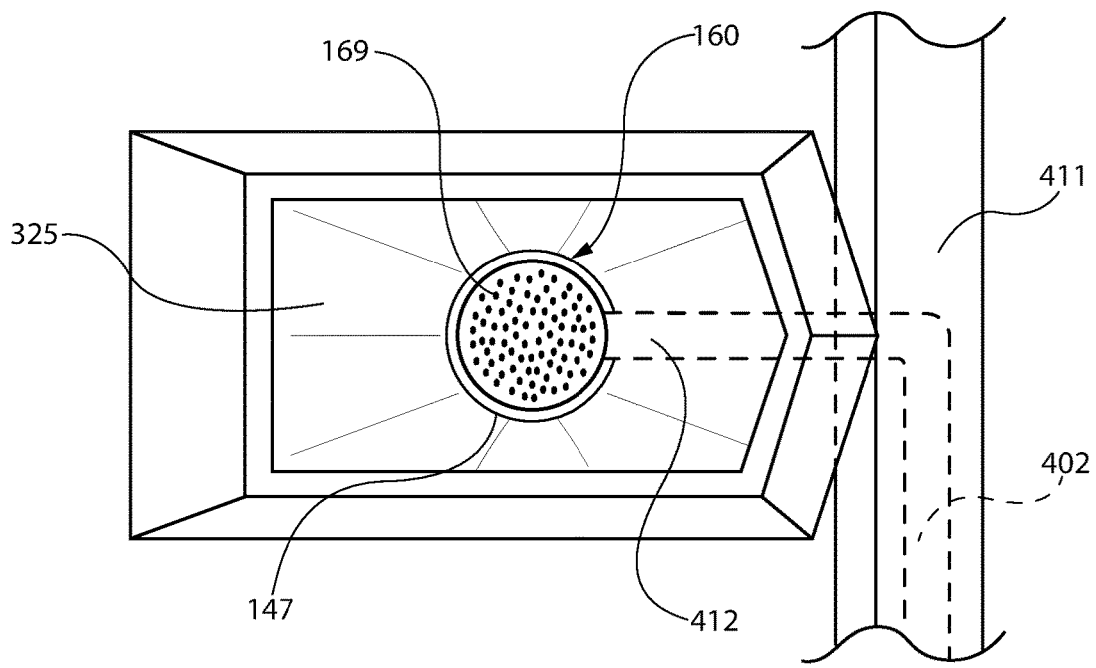
FIG. 30 is a top view of the aspect of the sixth embodiment shown in FIG. 29.

The basin 150 comprises a body having a length (front to back) that is longer than its width; the particular ratio calculated to accommodate use of the basin 150 adjacent to the perineal area of the human body. The basin 150 comprises a housing sized and shaped to enclose a sprayer assembly 160. In one aspect, the housing is shaped as a rounded bowl with an open top as seen in FIGS. 27-28. The width of the basin top is narrower than the width of the basin bottom. In another aspect of the invention, the housing is more angular with the width of the basin top being narrower than the width of the basin bottom. In a further aspect, the sprayer water line 412 is disposed interior of the basin 150, as seen in FIG. 27. In an additional aspect, the sprayer water line 412 is disposed below the floor of the basin 150 with the spray head 169 extending upwardly above the basin floor 325, as seen in FIG. 29.

The basin 150 is sized and configured to accommodate the sprayer assembly 160 and to hold the residual water, which will then drain out. The bottom portion of the basin 150 is configured with a drain hole 149 defined by drain hole edges 147. The basin 150 is suspended (via crossbar 411) in the middle of the toilet bowl (when in the functional position) with the drain hole 149 positioned generally in the middle of the toilet bowl to allow drainage of used water and any carried material to drain into the toilet bowl. The basin floor 325 may be sloped downwards toward the drain hole 149 to facilitate drainage. In one aspect of the invention, the basin 150 is removable for washing or replacement. In one aspect, the basin 150 is replaceable and disposable, such as might be desired in a hospital setting. In another aspect, a first basin 150 may be replaced with a second basin 150, such as may be desired when the cleansing system 100 of the present invention is used by multiple members of one household. In the aspects in which the basin is replaceable, a basin connector 304 is functional to allow removal and replacement. For example, the basin connector 304 may be disposed between the basin 150 and the supporting crossbar 411. The basin connector 304 may be a quick connect, as is known in the art, for efficiency of connection and replacement.

In one aspect of the invention, the basin 150 may be vertically raised and lowered by a handle assembly 310, as discussed above in relation to the fifth embodiment.

In the aspect shown in FIGS. 23 and 24, wall-to-crossbar water line 425 (with at least one fluid flow passage therethrough) is connected to a household water supply pipe at shutoff valve 303. The wall-to-crossbar water line 425 extends from the shutoff valve 303 to a crossbar water line 402 that provides water to the sprayer and to a spray head 169 within the basin 150. The wall-to-crossbar water line 425 is sufficiently long enough to run from the shutoff valve 303 to the basin-incorporated toilet seat 400. The crossbar water line 402 preferably runs within one of the left or right sides of the crossbar 411, and then is fluidly connected to the sprayer water line 412 that provides water to the spray head 169 within the sprayer system 160 to provide water for cleansing. The wall-to-crossbar water line 425 is preferably structurally similar to the flexible feeder supply line 120 described above. A toilet tank water line 422 (seen in FIG. 24) runs from the shutoff valve 303 to the standard toilet tank to supply water to the tank. Preferably the user can access a switch assembly 301 to activate the flow of water from the water line 425 to the spray head 169. In another aspect of the invention, the switch 301 assembly (FIG. 23) provides more control options, such as to control the volume of water and/or the water temperature.

In the aspects shown in FIGS. 25 and 26, a water line provides water to the toilet tank. The toilet tank includes an interior water pump 404 that pumps water into the crossbar water line upon activation. In the aspect shown in FIG. 25, the external pump-to-crossbar water line 426 is exterior to the seat. In the aspect shown in FIG. 26. The internal pump-to-crossbar water line 427 is exterior to the seat interior of the seat for aesthetic reasons.

In some aspects of the invention, portions of the toilet seat 400 are padded with a layer of cushion, such as foam, gel, gel cellular material, or other soft cushiony material 322. In aspects, the forward surface of the opposing vertical sides of the vertical portion 414, the upper surface of the opposing horizontal sides of the horizontal portion 415, and/or the forward surface of the façade 409 may include cushioning 322 for the comfort of the user.

Also, to add comfort to the user, a water heating device 408 is included in some aspects of the invention. The water heater heats the water in the water line 425, 426, 427 or in a small reservoir within or near the water line or, as seen in FIG. 26, may heat the water within the water supply line inside the toilet tank. The heating device 408 is installed beside the water line 425, 426, 427 or may optionally be an inline heater. The heating device 408 may be battery powered, mechanically powered, or electrically powered.

To use the basin-incorporated toilet seat 400, a user is seated on the horizontal portion 415 of the seat 400 and, if the basin 150 is in the functional position, the user moves the basin 150 to the storage position. The user then proceeds to use the toilet as usual. If cleansing of the perineal area is desired, the user then slides the basin 150 into the functional position in the center of the toilet bowl. In one aspect of the invention, the basin 150 can be raised; this can be achieved using the disclosed mechanisms of the fifth embodiment or by other means. In this aspect, the user may raise the basin 150 to achieve a better fit. The user then engages the switch to begin spraying water. The water cleanses the area of the body to which it is directed, and thereby rinses away any urine or fecal material. The residual water and any debris are washed down the drain 149 and into the water within the toilet bowl. The user then engages a control in the switch assembly 310 to end the spraying of water. The basin 150 can remain in the functional position or can then be moved to the storage position.

In the aspect of the invention in which the crossbar 411 is manually movable, the user grasps the handles 410 and manually slides the crossbar 411 carrying the basin 150 to move the basin 150 between the functional and storage positions and vice versa. In the aspect in which the crossbar 411 is mechanically moved, the user may merely push a button or engage a switch to move the basin 150 into and out of the positions.

In one aspect of the invention, the basin-incorporated toilet seat 400 of the sixth embodiment is sold as an add-on to a standard toilet, as seen in FIGS. 23-24. The add-on toilet seat 400 is easy to install. The wall-to-crossbar water line 425 connects the crossbar 411 to a convenient household water line, such as at a wall shutoff valve 303. A tee may be inserted at the shutoff valve 303 if needed to accommodate a separate water intake for the toilet 175.

In another aspect, the basin-incorporated toilet seat 400 and a specialized toilet are sold together. The specialized toilet may have a tank with a narrower top to allow a greater reclining angle (as seen in FIGS. 23, 25, 26) and/or may have a portion of the water supply integrated into the toilet water tank (as seen in FIGS. 25, 26). In the aspect shown in FIG. 25, the water tank 420 is configured with a water pump 404 and a side outlet (shown as side cutoff valve 403) to which the external pump-to-crossbar water line 426 is attached. In the aspect shown in FIG. 26, the water tank 420 is configured with a water pump 404 and an outlet that is concealed behind the toilet seat 400 but allows the internal pump-to-crossbar water line 427 to be attached. In this aspect, water line 427 runs within the toilet seat 400 instead of being exterior as in FIG. 25. To facilitate control during extension and retraction of the water line 427, a reel 430 or other control measures may be incorporated into the inventive toilet seat 400. Upon activation, the pump 404 pumps water through interior supply line 426, 427, into the water line 402 within the crossbar 411, on into the sprayer water line 412, and out the spray head 169.

In any of the embodiments, one or more gaskets (such as gasket 162 in FIG. 4) may be used to achieve a tight seal at any connection or at all the connections.

The cleansing system 100 of the present invention is specifically designed to efficiently clean the perineal area. It provides advantages for those with limited mobility, but also for all others who want to clean the perineal area. Use of the system not only cleanses the skin, but it also disposes of the residual water and any debris. Further, no alterations to the household plumbing are required, no reconstruction of the bathroom is needed, and it does not require additional floor space to install, as would a conventional separate bidet. The cleansing system 100 also provides ecological savings. The use of the invention reduces or eliminates the need for toilet paper, which in turn reduces or eliminates the need to harvest trees for production of toilet paper. (Tens of thousands of trees are cut down every day for this use.) Additionally, the use of the inventive cleansing system provides advantages in septic tank maintenance and in municipal sewage treatment, which are also due to the reduction or elimination of toilet paper usage.

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A personal perineal cleansing system for use with a toilet comprising:
    a toilet seat connectable to the toilet comprising a horizontal seat portion, a vertical portion, and a junction portion disposed between the horizontal seat portion and the vertical portion that together are generally shaped as a curved L-shape; said toilet seat further comprising a basin, a sprayer carried within said basin, a basin-mounting assembly supporting the basin, and a basin re-positioning system configured to move the basin from within the horizontal seat portion to the vertical portion.

2. The personal perineal cleansing system for use with a toilet as recited in claim 1, wherein:
    the basin-mounting assembly comprises a crossbar having a right end member and a left end member; and
    the toilet seat further comprises right and left channels defined by right and left channel edges, respectively, that accommodate the right end member and the left end member of the basin-mounting assembly, respectively.

3. The personal perineal cleansing system for use with a toilet as recited in claim 2, wherein the basin-mounting assembly further comprises a left handle disposed at the left end member and a right handle disposed at the right end member.

4. The personal perineal cleansing system for use with a toilet as recited in claim 1, wherein the toilet seat further comprises:
    a right channel defined by right channel edges disposed within a section of a right horizontal side of the horizontal seat portion, extending through a right junction portion of the junction portion, and extending on into a midsection of a right side of the vertical portion; and
    a left channel defined by left channel edges disposed within a section of a left horizontal side of the horizontal seat portion, extending through a left junction portion of the junction portion, and extending on into a midsection of a left side of the vertical portion.

5. The personal perineal cleansing system for use with a toilet as recited in claim 4, wherein the basin-mounting assembly is manually movable from the horizontal seat portion to the vertical portion and manually movable from the vertical portion to the horizontal seat portion.

6. The personal perineal cleansing system for use with a toilet as recited in claim 4, wherein the basin-mounting assembly is mechanically movable from the horizontal seat portion to the vertical portion and mechanically movable from the vertical portion to the horizontal seat portion.

7. The personal perineal cleansing system for use with a toilet as recited in claim 1, wherein:
    the basin-mounting assembly comprises a crossbar;
    a crossbar water line is disposed inside the crossbar; and
    the crossbar water line is fluidly connected to a sprayer water line to supply water to the sprayer.

8. The personal perineal cleansing system for use with a toilet as recited in claim 7, wherein the sprayer water line is disposed substantially within the basin.

9. The personal perineal cleansing system for use with a toilet as recited in claim 7, wherein the sprayer water line is disposed substantially below the basin.

10. The personal perineal cleansing system for use with a toilet as recited in claim 7, further comprising a wall-to-crossbar water line to supply water to the crossbar water line.

11. The personal perineal cleansing system for use with a toilet as recited in claim 7, wherein:
    the toilet comprises a water tank and a water pump disposed within the water tank; and
    the personal perineal cleansing system comprises a pump-to-crossbar water line fluidly connected to the water pump and to the crossbar water line to supply water to the crossbar water line.

12. The personal perineal cleansing system for use with a toilet as recited in claim 1, wherein:
    the basin-mounting assembly comprises a crossbar;
    the basin is connected to the crossbar; and
    the basin comprises an open-top container, a basin top, a basin bottom, and at least one basin drain hole defined by drain hole edges whereby residual water can drain into the toilet.

13. The personal perineal cleansing system for use with a toilet as recited in claim 12, wherein the width of the basin top is narrower than the width of the basin bottom.

14. The personal perineal cleansing system for use with a toilet as recited in claim 12, wherein the width of the basin top is wider than the width of the basin bottom.

15. The personal perineal cleansing system for use with a toilet as recited in claim 1, wherein the basin-mounting assembly is retained in the vertical portion of the toilet seat by friction.

16. The personal perineal cleansing system for use with a toilet as recited in claim 1, wherein the basin-mounting assembly is retained in the vertical portion of the toilet seat by a releasable mechanical locking mechanism.

17. The personal perineal cleansing system for use with a toilet as recited in claim 1, further comprising a water heater.

18. A method of use of a cleansing system for cleansing a perineal area, comprising:
    sitting on a horizontal portion of a toilet seat attached to a toilet;
    moving a basin from a storage position to a functional position by use of a basin re-positioning system; wherein the storage position is in a vertical portion of the toilet seat; and wherein the functional position is in the horizontal portion of the toilet seat; and
    activating water flow from a sprayer disposed within the basin to spray water onto the perineal area.

19. The method of use of a cleansing system for cleansing a perineal area, as recited in claim 18, wherein moving a basin comprises:
    sliding a crossbar carrying the basin within right and left channels disposed within the toilet seat.

* * * * *